United States Patent
Esposito et al.

(10) Patent No.: US 10,656,792 B2
(45) Date of Patent: May 19, 2020

(54) DATA-AGGREGATION GRAPHICAL USER INTERFACES

(71) Applicant: The Toronto-Dominion Bank, Toronto (CA)

(72) Inventors: Helene Nicole Esposito, Toronto (CA); Paul Mon-Wah Chan, Toronto (CA); John Jong Suk Lee, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 520 days.

(21) Appl. No.: 15/349,508

(22) Filed: Nov. 11, 2016

(65) Prior Publication Data

US 2018/0136792 A1   May 17, 2018

(51) Int. Cl.
*G06F 3/048* (2013.01)
*G06F 3/0482* (2013.01)
*G06Q 10/06* (2012.01)
*G06Q 40/02* (2012.01)
*G06F 3/0481* (2013.01)
*G06F 3/0488* (2013.01)

(52) U.S. Cl.
CPC .......... *G06F 3/0482* (2013.01); *G06F 3/0488* (2013.01); *G06F 3/04817* (2013.01); *G06Q 10/06311* (2013.01); *G06Q 40/02* (2013.01)

(58) Field of Classification Search
None
See application file for complete search history.

(56) References Cited

U.S. PATENT DOCUMENTS 6,128,603 A * 10/2000 Dent ................. G06Q 20/04
                                                       705/33
8,112,354 B2   2/2012 Lalwani et al.
(Continued)

FOREIGN PATENT DOCUMENTS

WO    WO 01/57753    8/2001

OTHER PUBLICATIONS

"Want to pay without the wait?," 2015 (retrieved from https://pay.opentable.com on Nov. 11, 2016) (9 pages).
(Continued)

*Primary Examiner* — William C Trapanese
(74) *Attorney, Agent, or Firm* — Duane Morris LLP

(57) ABSTRACT

The disclosed embodiments include computer-implemented devices and processes that generate, present, and manipulate data-aggregating graphical user interfaces. For example, a network-connected device may generate a first interface element representative of an obligation and may display, through a display unit, an graphical user interface that includes the first interface element and a plurality of second interface elements representative of time periods available for resolving the obligation. The network-connected device may receive, from an input unit, first input data indicative of a selection of the first interface element and second input data indicative of a movement of the selected first interface element from the first position to a second position within the interface. The network-connected device may associate the second position with a corresponding one of the second interface elements, and in response to the association, schedule the obligation for resolution during the time period represented by the corresponding second interface element.

20 Claims, 15 Drawing Sheets

(56) References Cited

U.S. PATENT DOCUMENTS

| | | | |
|---|---|---|---|
| 8,380,591 B1 * | 2/2013 | Kazenas | G06Q 20/145 |
| | | | 705/30 |
| 8,560,450 B2 | 10/2013 | Kumar et al. | |
| 8,645,182 B2 | 2/2014 | Johnson et al. | |
| 2011/0184863 A1 | 7/2011 | Coleman et al. | |
| 2011/0264582 A1 | 10/2011 | Kim et al. | |
| 2013/0124376 A1 * | 5/2013 | Lefebvre | G06Q 20/102 |
| | | | 705/34 |
| 2013/0268434 A1 | 10/2013 | Moshenzadeh | |
| 2015/0254617 A1 | 9/2015 | Rodriguez et al. | |

OTHER PUBLICATIONS

Craig, "Use Google Calendar to Pay Your Bills on Time," Jul. 20, 2016 (41 pages).

* cited by examiner

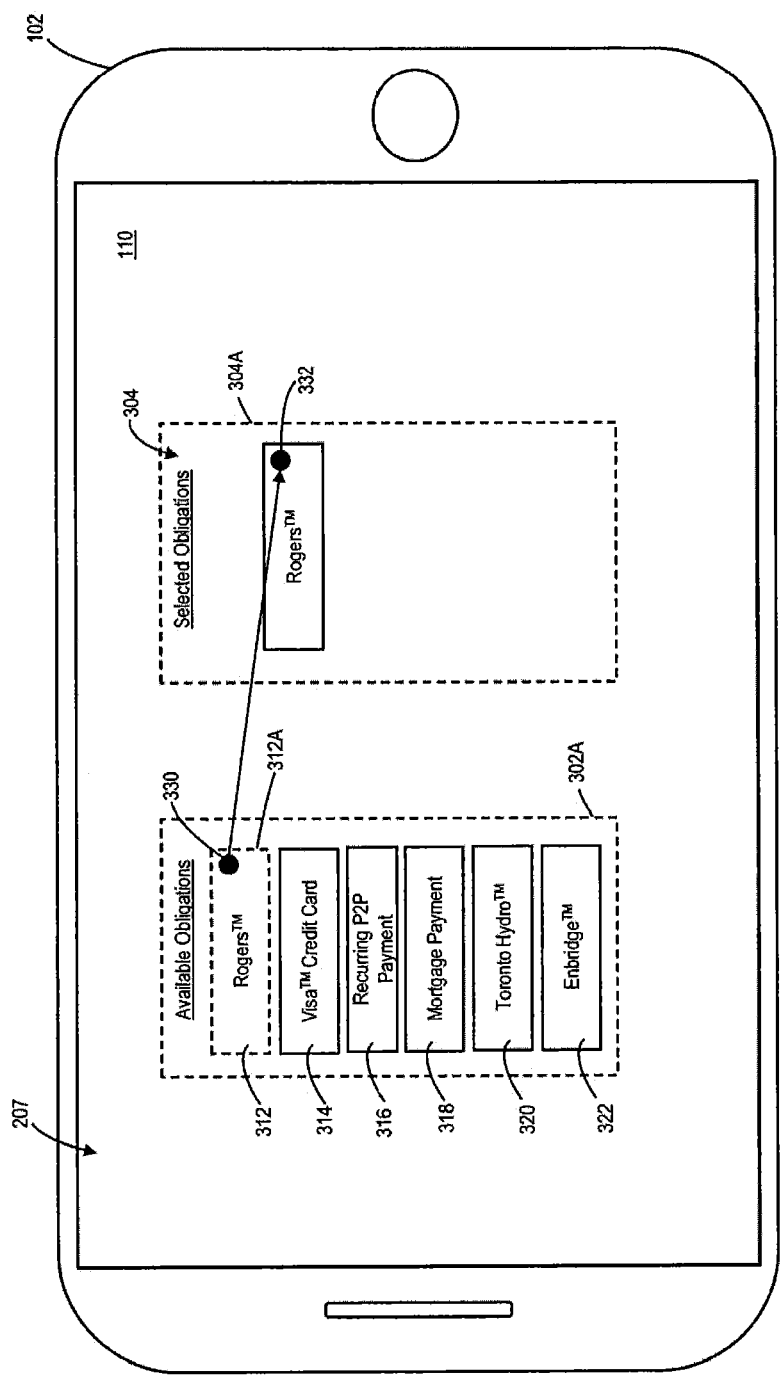

US 10,656,792 B2

DATA-AGGREGATION GRAPHICAL USER INTERFACES

TECHNICAL FIELD

The disclosed embodiments generally relate to computer-implemented systems and processes that generate, present, and perform operations involving data-aggregating graphic user interfaces.

BACKGROUND

Many graphical user interfaces, including those that support electronic payment services and financial transactions, present data to users in tabular format across multiple interface screens. This tabular data representation often leads to data misinterpretation by users and mental capture errors as users scroll from screen to screen to access various interface functionalities.

SUMMARY

The disclosed embodiments include, among other things, computer-implemented processes that aggregate data obtained from multiple sources into a single graphical user interface (GUI), which may enable a user to interact with the aggregated data in an intuitive way and perform operations on the aggregated data through that single GUI. For example, and in accordance with certain of the disclosed embodiments, a device may include a display unit, an input unit, a storage unit storing instructions, and at least one processor coupled to the display unit, the input unit, and the storage unit. The at least processor may be configured to execute the instructions to generate a first interface element representative of an obligation and display, on the display unit, an interface that includes the first interface element and a plurality of second interface elements. In one aspect, the first interface element may be disposed at a first position within the interface, and the second interface elements may be representative of time periods available for resolving the obligation. The at least processor may be further configured to execute the instructions to receive first input data from an input unit indicative of a selection of the first interface element, receive second input data from the input unit indicative of a movement of the selected first interface element from the first position to a second position within the interface, and establish an association between the second position of the selected first interface element and a corresponding one of the second interface elements. In response to the established association, the at least processor may be further configured to execute the instructions to perform operations that schedule the obligation for resolution during the time period represented by the corresponding second interface element.

In other embodiments, a computer-implemented method may generate, by at least one processor, a first interface element representative of an obligation, and display, by the at least one processor, and on a display unit coupled to the at least one processor, an interface that includes the first interface element and a plurality of second interface elements. In one aspect, the first interface element may be disposed at a first position within the interface, and the second interface elements may be representative of time periods available for resolving the obligation. The method may also include the steps of receiving, by the at least one processor, first input data from an input unit indicative of a selection of the first interface element, receiving, by the at least one processor, second input data from the input unit indicative of a movement of the selected first interface element from the first position to a second position within the interface, and establishing, by the at least one processor, an association between the second position of the selected first interface element and a corresponding one of the second interface elements. In response to the established association, the method may also perform, by the at least one processor, operations that schedule the obligation for resolution during the time period represented by the corresponding second interface element.

Further, and in additional embodiments, a tangible, non-transitory computer-readable medium may store instructions that, when executed by at least one processor, perform a method that include generating a first interface element representative of an obligation, and displaying, on a display unit coupled to the at least one processor, an interface that includes the first interface element and a plurality of second interface elements. In one aspect, the first interface element may be disposed at a first position within the interface, and the second interface elements may be representative of time periods available for resolving the obligation. The method may also include the steps of receiving, by the at least one processor, first input data from an input unit indicative of a selection of the first interface element, receiving, by the at least one processor, second input data from the input unit indicative of a movement of the selected first interface element from the first position to a second position within the interface, and establishing, by the at least one processor, an association between the second position of the selected first interface element and a corresponding one of the second interface elements. In response to the established association, the method may also perform, by the at least one processor, operations that schedule the obligation for resolution during the time period represented by the corresponding second interface element.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

FIGS. 3A-3C are diagrams of exemplary graphical user interfaces, consistent with the disclosed embodiments.

DETAILED DESCRIPTION

Figure 1:
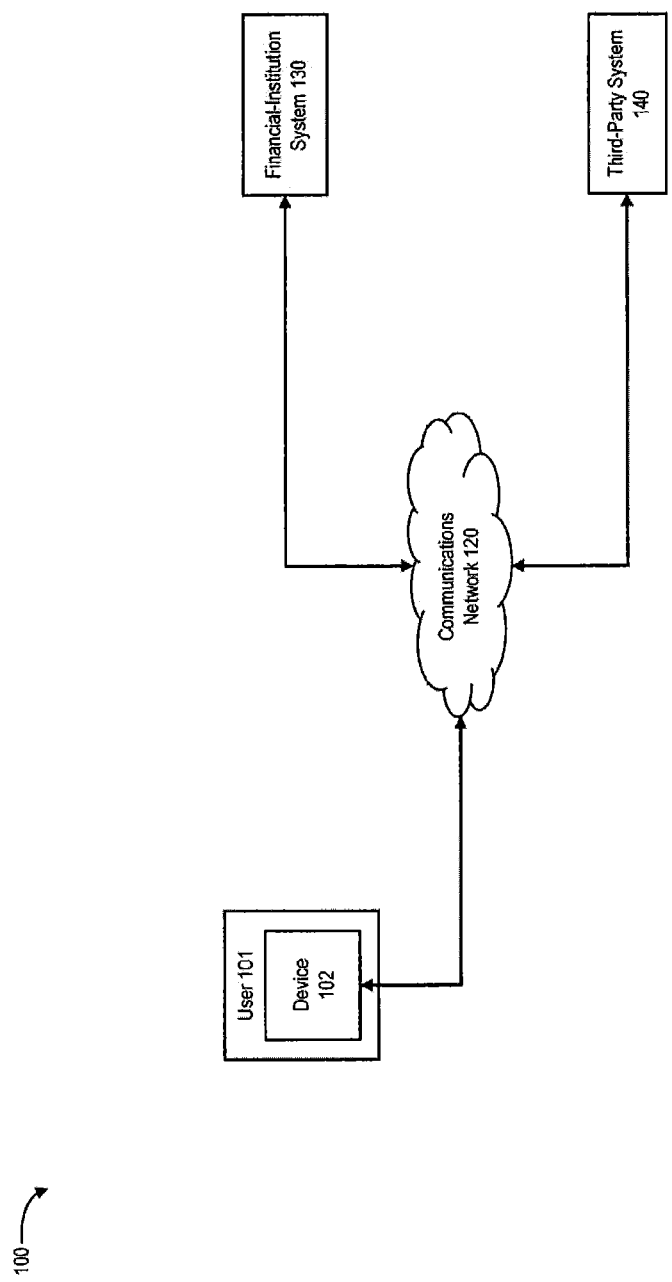
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

This specification describes exemplary computer-implemented processes that aggregate data obtained from multiple sources into a single graphical user interface (GUI), which may enable the user to interact with the aggregated data in an intuitive way and perform operations on the aggregated data through that single GUI. The single GUI may, for example, aggregate and present data identifying one or more obligations of the user concurrently with data identifying dates or times available for resolving the obligations, and the single GUI may be presented by a device operated by the user through a corresponding display unit, such as a liquid-crystal display. In some aspects, by providing input to the device, e.g., through a corresponding input unit, that selectively arranges certain interface elements within the single GUI, the user may establish a schedule for resolving one or more of the obligations on corresponding ones of the available dates or time. Further, and as described below, the device may present additional interface elements within that single GUI that facilitate the user's visualization of not only the established schedule for resolving the one or obligations, but also temporal relationships between the scheduled resolutions and occurrences of other events that impact or are associated with the user.

In one embodiment, an obligation may correspond to an act or course of action which user 101 is bound to perform by mutual agreement with one or more counterparties. In some instances, obligations consistent with the disclosed embodiments may require the user to transfer funds to a counterparty in exchange for products purchased by the user during a particular time period, in exchange for resources consumed by the user during the particular time period, or in exchange for serviced rendered to the user by the counterparty during that particular time period. Additionally, the obligation may be associated with a corresponding deadline, which may establish a date or time before which the obligation must be resolved to the satisfaction of the counterparty. In some aspects, one or more of the exemplary GUIs described below may include interface elements that indicate, to the user, a relationship between a scheduled resolution of an obligation, e.g., on a user-specified date or time, and a corresponding deadline associated with that obligation.

For example, the user may hold a credit-card account (e.g., a Visa™ credit card) issued by a corresponding financial institution, which may generate and provide to the user a monthly invoice outlining the user's obligation to pay at least a minimum monthly payment by a corresponding due date. In other instances, the user may hold a mortgage on a residence, and the terms of the mortgage may obligate the user to transfer, to a financial institution, funds in accordance with a specified repayment schedule. Additionally, the user may receive monthly invoices from various utilities, such as municipal electrical, water, telephone, and/or gas utilities, that obligate the user to submit payment to the utilities by a specified date for the user's consumption of resources (e.g., units of consumed electricity, water, or gas) during a prior metering period. The user may also enter into service agreements with wireless providers and cable companies, which may obligate the user to pay monthly fees for accessed wireless spectrum and/or consumed digital content. The disclosed embodiments are not limited to these exemplary obligations, and in further aspects, obligations consistent with the disclosed embodiments may include any additional or alternate recurring or one-time obligation, such as a monthly payment on a vehicle loan, payments supporting a recurring person-to-person (P2P) transaction, and recurring payments that cover tickets to various sporting events.

I. Exemplary Computing Environments

FIG. 1 is a diagram of an exemplary computing environment 100, consistent with certain disclosed embodiments. In some aspects, as illustrated in FIG. 1, environment 100 may include one or more devices, such as device 102, one or more computer systems associated with financial institutions, such as financial institution system 130, and one or more computer systems associated with third-party business entities, such as third-party computing systems 140, each of which may be interconnected through any appropriate combination of communications networks, such as network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In an embodiment, device 102 may be associated with a user, e.g., user 101, and may correspond to a computing device that includes one or more tangible, non-transitory memories that store data and/or software instructions, and one or more processors configured to execute the software instructions. The one or more tangible, non-transitory memories may, in some aspects, store software applications, application modules, and other elements of code executable by the one or more processors, such as web browsers and other applications provided by or associated with various entities, such as those associated with and that maintain financial institution system 130 and third-party computing systems 140. In additional aspects, the one or more tangible, non-transitory memories may also store, among other things, obligation data that identifies one or more obligations associated with user 101, calendar data that identifies one or more days available for resolving obligations within a predetermined or user-specified time period, scheduling data that identifies a user-specified schedule for resolving the one or more obligations, payment data identifying payment instruments or funding sources available for user in resolving the obligations, and any additional or alternate data that supports the computer-implemented processes for generating, presenting, and manipulating the exemplary interfaces described below.

Device 102 may also include a display unit that displays information to user 101 and additionally or alternatively, an input unit that to allow user 101 to input information to device 102 (e.g., a keypad, keyboard, capacitive overlays, voice-activated control technologies, or any other type of known input device). In one aspect, the display unit and input unit may be incorporated into a single interface unit that displays the information to user 101 and also allows user 101 to input information to device 102. For example, the display unit may correspond to a liquid-crystal display (LCD) unit, and the input device may correspond to a capacitive overlay disposed on a surface of the LCD unit (e.g., on a corresponding LCD screen) to form the interface unit (e.g., a pressure-sensitive, touchscreen interface unit). In other aspects, and consistent with the disclosed embodiments, the input unit may include a keypad, keyboard, mouse, microphone, or other input device appropriate to device 102, and device 102 may include a display unit that is separate and distinct from the input unit.

Additionally, device 102 may include a communications module, such as a wireless transceiver device, coupled to the one or more processors and configured by the one or more processors to establish and maintain communications with network 120 using any of a number of communications protocols, which include, but are not limited to, Internet Protocol (IP) communications protocols, Hypertext Transfer (HTTP) communications protocol, near-field communications (NFC) protocols, and other communications protocols appropriate to device 102 and to network 120. In further instances, device 102 may also include a digital camera, which may be coupled to the one or more processors and configured by the one or more processes to capture digital images of bills or other invoices representative of obligations held by user 101.

Examples of device 102 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on an display unit, consistent with disclosed embodiments. In some instances, user 101 may operate device 102 and may do so to cause device 102 to perform one or more operations consistent with the disclosed embodiments.

Financial-institution system 130 and third-party systems 140 may, in some aspects, represent corresponding computer systems configured to execute software instructions (e.g., one or more executable applications or application modules) that perform operations consistent with disclosed embodiments. For example, financial institution system 130 may be maintained by a financial institution, which may issue payment instruments held by user 101, such as credit cards or debit cards, and which hold financial services accounts on behalf of user 101, such as checking, savings, or brokerage account. In certain instances, and as described below, financial-institution system 130 may perform operations that, in response to a request transmitted from device 102, authenticate user 101 based on obtained authentication credentials and further, provide data to device 102 that identifies one or more obligations associated with user 101 (e.g., data identifying monthly invoices for credit-card accounts issued by the financial institution) and additionally or alternatively, data identifying one or more payment instruments (e.g., credit cards, debit cards, etc.) and funding sources (e.g. checking, savings, and/or brokerage accounts) issued or held by the financial institution and available to resolve the obligations.

Further, in some aspects, one or more of third-party systems 140 may be maintained by a third-party business, governmental, or regulatory entity associated with a one-time or recurring obligation involving user 101, and additionally or alternatively, associated with a one-time or recurring event that impacts user 101. In certain instances, and as described below, third-party systems 140 may perform operations that, in response to a request transmitted from device 102, authenticate user 101 based on obtained authentication credentials and further, provide data to device 102 that identifies one or more obligations associated with user 101 and additionally or alternatively, one or more events that impact user 101.

For example, one or more of third-party systems 140 may be maintained by a business entity, such as a gym that charges user 101 a recurring monthly membership fee or a professional team that charges user 101 recurring monthly fees for a season-ticket package. Additionally or alternatively, third-party systems 140 may be maintained by a governmental or regulatory entity, such as a tax authority that imposes upon user 101 a one-time or recurring consumption tax, or a utility that issues monthly invoices that account for a consumption of resources by user 101 during a prior metering period. In other instances, one or more of third-party systems 140 may be maintained by a payroll service, which may deposit wages into a financial services account of user 101 in accordance with a predetermined schedule, e.g., on the $15^{th}$ and $30^{th}$ day of each month. The disclosed embodiments are not limited to these exemplary business, governmental, and regulatory entities, and in other aspects, one or more of third-party systems 140 may be maintained by any additional or alternate entity that associated with obligations or events that involve or impact user 101, which may be resolved using the exemplary processes and graphical user interfaces described below.

In one instance, financial-institution and third-party systems 130 and 140 may include one or more servers and tangible, non-transitory memory devices storing executable code and application modules. Further, the servers may include one or more processor-based computing devices, which may be configured to execute portions of the stored code or application modules to perform operations consistent with the disclosed embodiments, including operations consistent with the exemplary micropayment settlement processes described herein. In other instances, and consistent with the disclosed embodiments financial-institution system 130 and/or third-party systems 130 and 140 may correspond to a distributed system that may include computing components distributed across one or more networks, such as network 120, or other networks, such as those provided or maintained by cloud-service providers.

II. Exemplary Computer-Implemented Processes for Generating, Presenting, and Resolving Events Data-Aggregating Graphical User Interfaces In certain embodiments, a network-connected device, e.g., device 102 of FIG. 1, may perform operations to generate a graphical user interface (GUI) that identifies not only one or more outstanding obligations held by a user, e.g., user 101, but also temporal relationships between scheduled resolutions of these outstanding obligations, one or more deadlines associated with these outstanding obligations, and further, additional events that impact user 101 during a corresponding time period. Device 102 may, in some instances, be configured to present the generated GUI through a corresponding display unit, and user 101 may provide, through a corresponding input unit, input to device 102 that selectively arranges certain interface elements within the presented GUI to specify the schedule for resolving corresponding ones of the outstanding obligations and further, to specify sources of funding for the resolved obligations.

As described above, an obligation may correspond to an act or course of action to which user 101 is bound to perform by mutual agreement with one or more counterparties, and an outstanding obligation may refer to an obligation that requires an appropriate resolution, e.g., the performance of the corresponding act or course of action by user 101. In one instance, an outstanding obligation may require user 101 to transfer funds to one or more counterparties in exchange for products purchased during a particular prior time period, in exchange for resources consumed during the particular prior time period, or in exchange for serviced rendered by the one or more counterparties during that particular prior time period. By way of example, the required transfer of funds may correspond to a payment transaction initiated by device 102, either alone or in conjunction with other network-connected computer systems, in satisfaction of a bill or an invoice issued by the one or more counterparties, which may be associated with a corresponding payment deadline.

Figure 2:
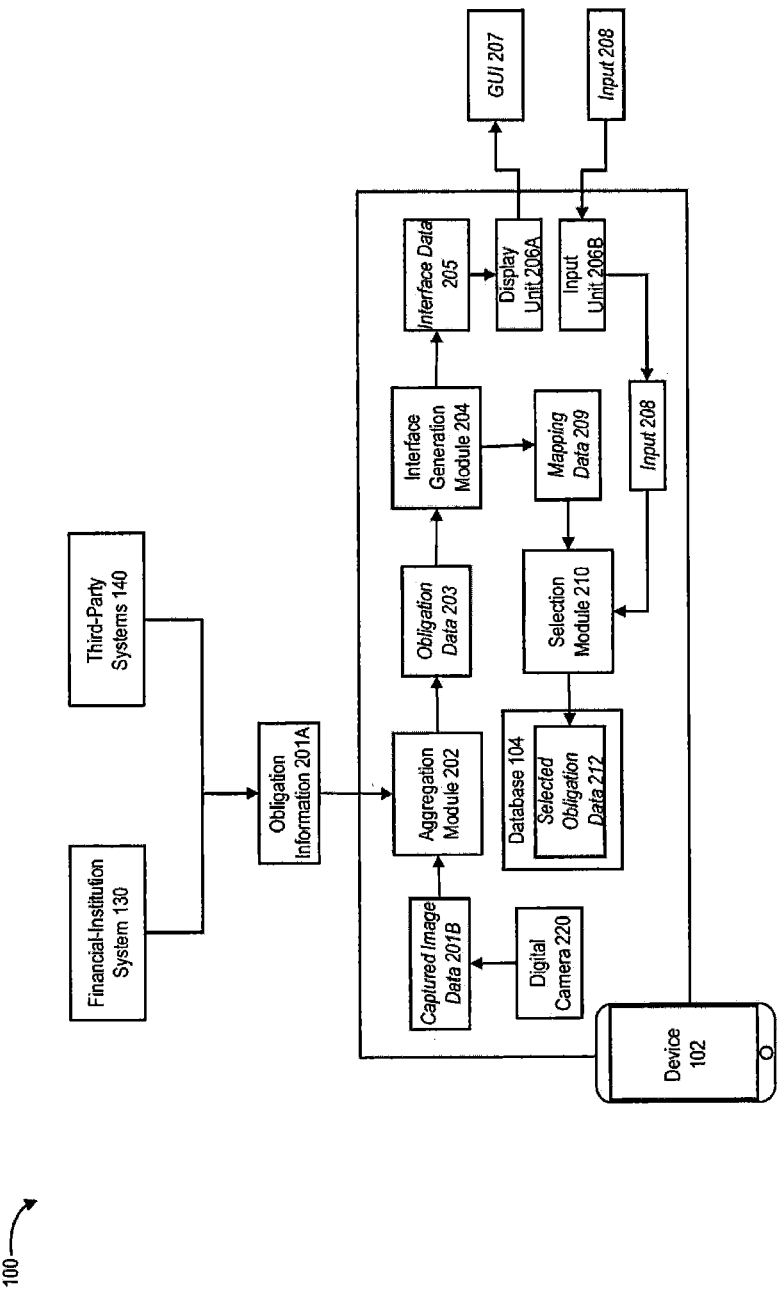
FIG. 2 is a diagram illustrating a portion of an exemplary computing environment, consistent with the disclosed embodiments.

In some aspects, and referring to FIG. 2, an aggregation module 202 of device 102 may perform operations that poll one or more network-connected computer systems, such as financial-institution system 130 and third-party systems 140 of FIG. 1, for obligation data that identifies and characterizes outstanding obligations held by user 101. For example, aggregation module 202 may generate requests for the obligation data that identify device 102 (e.g., through a unique device identifier, such as a MAC address, or a unique network identifier, such as an IP address) and additionally or alternatively, that specify one or more authentication credentials of user 101, such as an alpha-numeric login or password assigned to user 101 or a biometric credential associated with user 101, which user 101 may provide as input to device 102 during an initial authentication process (not depicted in FIG. 2). Device 102 may, in certain instances, transmit the generated requests across network 120 to corresponding ones of financial-institution system 130 and third-party systems 140.

Financial-institution system 130 and third-party systems 140 may receive the transmitted requests from device 102, and may perform operations that authenticate device 102 (e.g., based on the device or network identifier) and/or user 101 (e.g., based on the authentication credentials), and generate portions of information, e.g., obligation information 201A, that identify and characterize one or more obligations involving the financial institutions and business entities that maintain corresponding ones of financial-institution system 130 and third-party systems 140. For example, the financial institution may issue a Visa™ credit card held by user 101, and may bill user 101 on a monthly basis for charges on the credit-card account incurred during a prior billing period. Additionally, in some instances, the financial institution may also hold a mortgage on user 101's residence, and may invoice user 101 for monthly mortgage payment in accordance with a predetermined repayment schedule.

In other instances, one or more of third-party systems 140 may be associated with a utility company, such as local electrical, water, or natural-gas utility, which may invoice user 101 on a monthly or bi-monthly basis for units of electricity, water, or natural gas consumed during a prior metering period. Additionally or alternatively, one or more of third-party systems 140 may be associated with a wireless provider or a cable company, which may invoice user 101 on a monthly basis for accessed wireless spectrum and/or consumed digital content in accordance with one or more service agreements. Further, and in certain instances, one or more of third-party systems 140 may be associated with a payroll service that deposits funds into one or more financial services accounts held by user 101 in accordance with a predetermined schedule, such as a deposit of bi-weekly wages on the $15^{th}$ and $30^{th}$ day of each month. The disclosed embodiments are not limited to these exemplary third-party systems, and in other aspects, third-party systems 140 may be include a computer system maintained by any additional or alternate business, governmental, or regulatory entity associated with obligations or events that involve or impact user 101.

Referring back to FIG. 2, financial-institution system 130 and third-party systems 140 may transmit the generated portions of obligation information 201A across network 120 to device 102. In some instances, aggregation module 202 may receive obligation information 201A, and may perform operations to process obligation information 201A and extract data that identifies one or more outstanding obligations held by user 101, e.g., obligation data 203, which aggregation module 202 may provide to an interface generation module 204 of device 102.

The disclosed embodiments are, however, not limited to processes that obtain portions of obligation data (e.g., obligation data 201A) from one or more network-connected computer systems, such as financial-institution system 130 and third-party systems 140. In other instances, user 101 may receive physical copies of bills or invoices generated by one or more of a financial institution, a business entity, a governmental entity, or a regulatory entity. For instance, these physical bills or invoices may include information that identifies user 101 (e.g., a corresponding account number that uniquely identifies user 101), amounts associated with the underlying obligations, deadlines for resolving the obligations, and additionally or alternatively, instructions for resolving the obligations (e.g., instructions for remitting payment, etc.).

Referring back to FIG. 2, user 101 may provide input to device 102 (e.g., through an input unit 206B) that causes a digital camera, such as digital camera 220, to capture image data 201B of the physical copies of the bills or invoices, which may be provided to aggregation module 202. Aggregation module 202 may, in certain aspects, perform operations that apply one or more image processing techniques and/or optical character recognition (OCR) techniques to captured image data 201B to identify the outstanding obligations associated with the physical copies of bills or invoices, and to generate additional portions of obligation data 203 that correspond to each of the outstanding obligations, which aggregation module 202 may provide to interface generation module 204.

By way of example, obligation data 203 may identify each of the one or more outstanding obligations, and for each outstanding obligation, specify a unique identifier that associated user 101 with the outstanding obligation (e.g., an account number assigned to user 101 by the financial institution, business entity, governmental entity, and/or regulatory entity), an amount associated with the outstanding obligation, a deadline for resolving the outstanding obligation, and additionally or alternatively, instructions for resolving the outstanding obligation (e.g., instructions for remitting payment, etc.). In other instances, and consistent with the disclosed embodiments, obligation data 203 may also include event data that identifies one or more additional events impacting user 101 (e.g., distributions of weekly, bi-weekly, or monthly wages to a financial services account held by user 101) and further, that specifies one or more scheduled occurrences of the events (e.g., a scheduled distribution date of the wages) and one or more event parameters (e.g., an amount of the distributed wages, etc.). For example, one or more of third-party systems 140 may be associated with a payroll service that manages a distribution of wages to user 101 on a weekly, bi-weekly, or monthly schedule, and device 102 may obtain potions of the event data from the corresponding one of third-party systems 140 using any of the exemplary processes described above.

In some aspects, interface generation module 204 may perform operations that generate interface elements representative of each of the identified outstanding obligations held by user 101 and each of the identified events that impact user 101, and further, that map the generated interface elements to corresponding positions within a graphical user interface (GUI), which device 102 may present to user 101 through a corresponding display unit 206A. By way of example, and as described above, display unit 206A may include a LCD unit, and input device 206B may correspond to a capacitive overlay disposed on a display surface of the LCD unit to form an integrated interface unit, such as a pressure-sensitive, touchscreen interface unit capable of rendering the generated interface elements for presentation at the corresponding positions within the GUI (e.g., through integrated display unit 206A) and receiving input from user 101 that responds to and manipulates the presented interface elements (e.g., through integrated input unit 206B). In other instances, display unit 206A and input unit 206B may be separate and distinct, and input device 206B may include any additional or alternate input device capable of receiving input from user 101, such as an additional touchscreen input device, a keyboard, a keypad, or a microphone.

Interface generation module 204 may, in certain instances, access data specifying dimensions of a surface of the pressure-sensitive, touchscreen display unit, which interface generation module 204 may process to generate the interface elements and map the generated interface elements to corresponding positions within the GUI, and thus, to corresponding presentation positions on display-unit surface. Additionally, and in some aspects, interface generation module 204 may also establish element sizes for each of the generated interface elements (e.g., based on a scaling of a predetermined element size in accordance with the dimensions of the display-unit surface), and establish values of one or more presentation characteristics, such as user-specified or predetermined elements colors, fonts or shadings.

In some aspects, interface generation module 204 may generate data, e.g., interface data 205, that includes the generated interface elements (and data specifying the established sizes and values of presentation characteristics) and the generated mapping data, which correlates the generated interface elements to corresponding presentation positions within the GUI and on the display-unit surface. Interface generation module 204 may provide interface data 205 to display unit 206A, which may render the generated interface elements for presentation to user 101 within a corresponding GUI, e.g., GUI 207.

As described below, in response to the presentation of GUI 207, user 101 may provide input data, e.g., input 208, to device 102 through input unit 206B (e.g., touch-based input provided to the display-unit surface of the pressure-sensitive, touchscreen display unit). In some aspects, input 208 may reflect a selective manipulation of the positions of one or more interface elements within presented GUI 207 by user 101, and a selection module 210 of device 102 may process input 108, either alone or in conjunction with mapping data 209, to characterize the selective manipulation of the one or more interface elements. Based on the characterization of that selective manipulation, selection module 210 may identify one or more of the outstanding obligations selected by user 101 for resolution using scheduling processes consistent with the disclosed embodiments, and further, establish a consent of user 101 to schedule the resolution of the selected obligations using any of the processes described below.

Figure 3A:
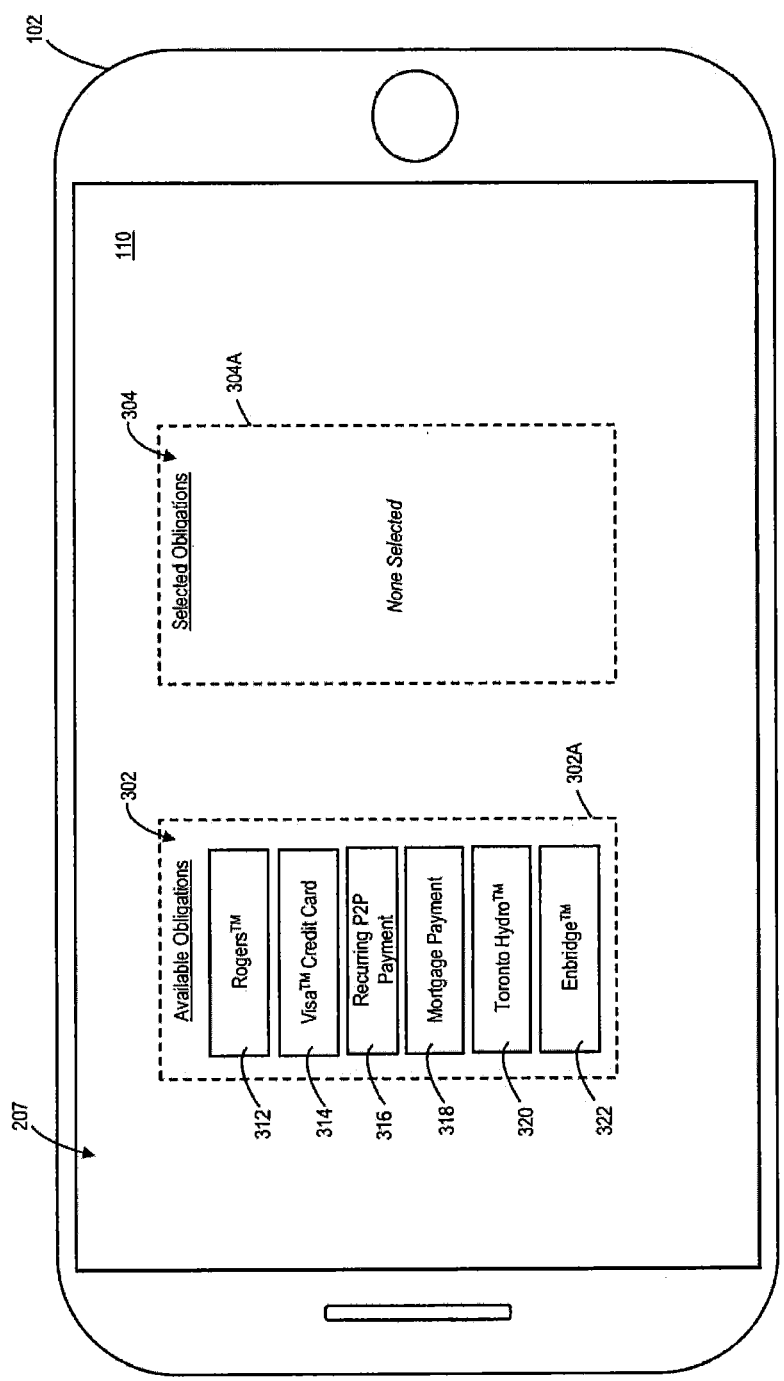

For example, as illustrated in FIG. 3A, device 102 may present GUI 207 through display unit 206A, which may correspond to the pressure-sensitive, touchscreen interface unit having a display-unit surface 110. In some aspects, presented GUI 207 may include interface elements 312, 314, 316, 318, 320, and 322, each of which correspond to an outstanding obligation held by user 101 and identified by device 102 using any of the processes described above. For example, interface element 312 may represent a wireless bill generated by Rogers™ Communications, which may be associated with a $45 monthly service fee and a due date of Nov. 27, 2016. Further, and by way of example, interface element 314 may represent a monthly bill for a Visa™ credit card account held by user 101, which may associated with a minimum payment of $85 due on or before Nov. 30, 2016, and interface element 316 may represent a recurring peer-to-peer (P2P) transaction that transfers $25 in funds from a financial services account of user 101 to an account held by an additional user on the fifteenth day of each month. Additionally, in some instances, interface element 318 may represent a recurring monthly mortgage payment of $2,850, which is due one or before Dec. 10, 2016, interface element 320 may represent a monthly electric bill in the amount of $30, which may be due to a local electrical utility, e.g., Toronto Hydro™, on or before Dec. 2, 2016, and interface element 322 may represent a monthly bill in the amount of $15 for user 101's consumption of natural gas, which may be due to a local natural-gas utility, e.g., Enbridge™ Gas Distribution, on or before Dec. 20, 2016. The disclosed embodiments are not limited to these exemplary interface elements and represented obligations, and in further aspects, GUI 207 may include interface elements associated with any additional or alternate obligation held by user 101, as described above.

Figure 3C:
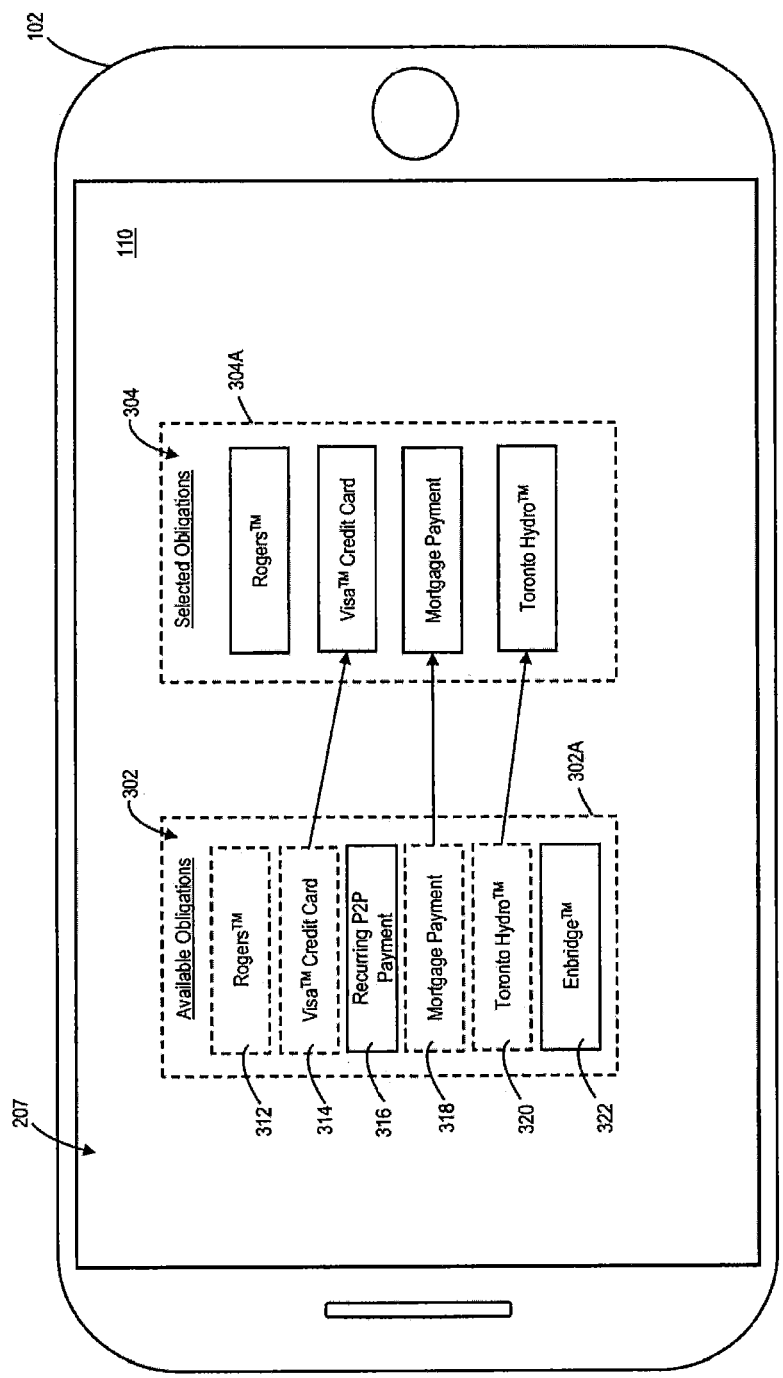

Referring back to FIG. 3A, interface elements 312, 314, 316, 318, 320, and 322 may be disposed within a portion 302 of GUI 207, which may be bounded by interface-portion boundary 302A, and which interface generation module 204 may associate with outstanding obligations that are available for resolution using any of the resolution using of the exemplary scheduling processes described below. Additionally, in certain aspects, interface generation module 204 may also define an additional portion 304 of GUI 207, which may be bounded by interface-portion boundary 304A, and which interface generation module 204 may associate with one or more of the available obligations, e.g., as included within portion 302, selected for resolution by user 101. In some aspects, and in addition to or an alternate to scheduling processes that require user 101 interact with and navigate through multiple, hierarchical menus to schedule obligations for resolution, the disclosed embodiments may enable user 101 to select one or more obligations for resolution by providing input to device 102 that manipulates positions of the corresponding interface elements within GUI 207, as described below in reference to FIGS. 3B and 3C.

For example, to select the wireless bill generated by Rogers™ Communication for resolution, user 101 may provide input, to device 102 through input unit 206B, that selects the presented interface element associated with the Rogers™ Communication bill, e.g., interface element 312, and provide additional input through input unit 206B that moves interface element 312 from its initial position within portion 302 of GUI 207 to a subsequent position within portion 304 of GUI 207. For example, as illustrated in FIG. 3B, user 101 may select interface element 312 by establishing contact between a finger and a portion of display-unit surface 110 enclosed by a boundary 312A of interface element 312 (e.g., at a first contact position 330). While maintaining contact with display-unit surface 110, user 110 may slide the finger across display-unit surface 110 to a second contact position 332 disposed within boundary 304A of interface portion 304, at which time user 101 may release the maintained contact between the finger and display-unit surface 110. In some aspects, illustrated in FIG. 3B, the translation of user 101's finger across display-unit surface 110 first contact position 330 to second contact position 332 corresponds to a movement of interface element 312 from a position within interface portion 302 to a corresponding position within interface portion 304, and indicates an intention of user 101 to schedule a resolution of the obligation associated with interface element 312, e.g., the Rogers™ Communication wireless bill, using scheduling processes consistent with the disclosed embodiments.

Additionally user 101 may also intend to schedule a resolution of the outstanding Visa™ credit card bill (e.g., associated with a minimum payment of $85 due by November 30$^{th}$), the mortgage payment (e.g., a $2,850 payment due by December 10$^{th}$), and the electric bill from Toronto Hydro™ (e.g., associated with a $30 payment due on December 2$^{nd}$) using scheduling processes consistent with the disclosed embodiments, such as those outlined below. In some aspects, depicted in FIG. 3C, user 101 may provide any of the exemplary input described above to move interface elements 314, 318, and 320, which correspond respectively to the outstanding Visa™ credit card bill, mortgage payment, and Toronto Hydro™ bill) from their initial positions within interface portion 302 to corresponding positions within interface portion 304. As described above, the provided input may indicate an intention by user 101 to schedule the resolution of the obligations associated with interface elements 314, 318, and 320 (e.g., the outstanding Visa™ credit card bill, mortgage payment, and Toronto Hydro™ bill) using scheduling processes consistent with the disclosed embodiments.

Referring back to FIG. 2, input unit 206B may capture input data 208, which may reflect a movement of interface elements 312, 314, 318, and 320 from their initial positions within interface portion 302 to their subsequent positions within interface portion 304, and may provide input data 208 to selection module 210. In some aspects, selection module 210 may also obtain mapping data 209 from interface generation module 204 (e.g., data that maps the generated interface elements to corresponding positions within GUI 207 and thus, corresponding positions within display-unit surface 110), and based on portions of input data 208, perform operations that establish and confirm the provided input reflects the movement of interface elements 312, 314, 318, and 320 from interface portion 302 to interface portion 304.

Referring to interface element 312 of FIG. 3B, and based on portions of obtained mapping data 209, selection module 210 may perform operations that confirm a disposition of first contact position 330 within boundary 312A of interface portion 302 of GUI 207, and that confirm a disposition of second contact position 332 within boundary 304A of interface portion 304 of GUI 207. In response to the confirmed dispositions, selection module 210 may perform operations that select the obligation represented by interface element 312 (e.g., the Rogers™ Communication wireless bill) for resolution using processes consistent with the disclosed embodiments. In some aspects, selection module 210 may perform additional operations that store data identifying the selected obligation (e.g., the Rogers™ Communication wireless bill) and one or more obligation parameters (e.g., the billed amount of $45 and the due date of November 27$^{th}$) in a portion of a data repository 104 maintained within one or more tangible, non-transitory memories, e.g., as selected obligation data 212.

Additionally, selection module 210 may apply any of the exemplary processes described above to portions of input data 206 and mapping data 209 to confirm that the input provided by user 101 reflects a movement of interface elements 314, 318, and 320 from interface portion 302 to interface portion 304 of GUI 207, and in view of the confirmation, select the obligations represented by interface elements 314, 318, and 320 (e.g., the outstanding Visa™ credit card bill, mortgage payment, and Toronto Hydro™ bill) for resolution using processes consistent with the disclosed embodiments. In some aspects, selection module 210 may perform additional operations that store data identifying the selected obligations (e.g., the outstanding Visa™ credit card bill, mortgage payment, and Toronto Hydro™ bill) and one or more obligation parameters (e.g., the corresponding obligation amounts and due dates) as a portion of selected obligation data 212 within data repository 144.

In further aspects, and upon selection of the outstanding Rogers™ Communication wireless bill, Visa™ credit card bill, mortgage payment, and Toronto Hydro™ bill, device 102 may perform operations that generate, and present to user 101 through display unit 206A, an additional graphical user interface (GUI) that, in response to input provided to input unit 206B that manipulates one or more presented interface elements, enables user 101 to schedule the selected obligations for resolution, and that further enables user 101 to view temporal relationships between the scheduled resolutions and other events that impact user 101, such as scheduled distributions of wages by a payroll system (e.g., one or third-party systems 140).

Figure 4:
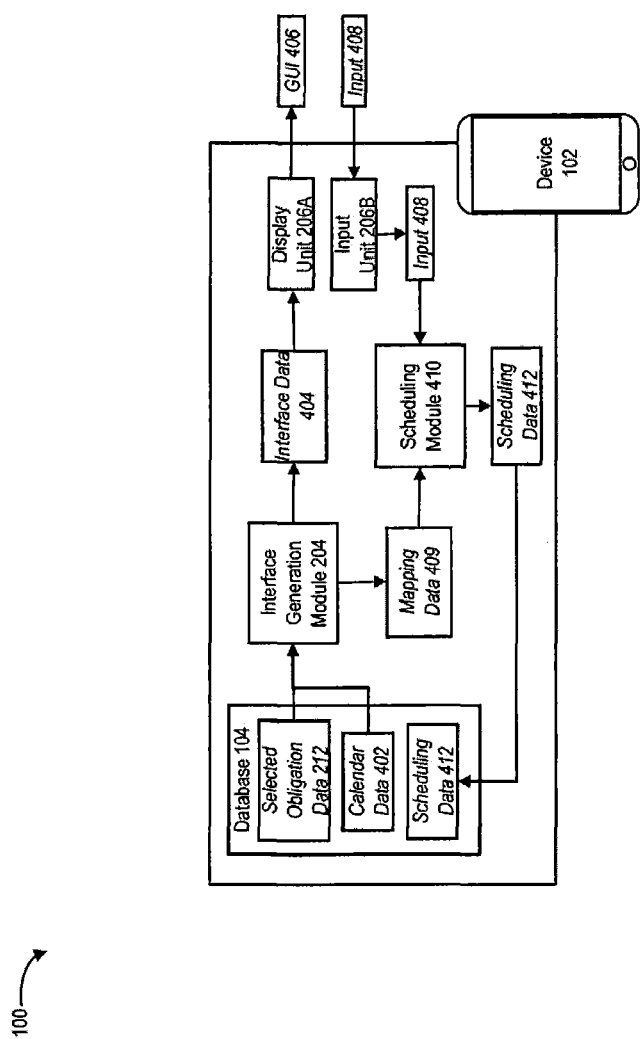
FIG. 4 is a diagram illustrating an additional portion of an exemplary computing environment, consistent with the disclosed embodiments.

For example, and referring to FIG. 4, interface generation module 204 may access data specifying dimensions of display-unit surface 110 (e.g., as maintained by display unit 206A), and may perform any of the exemplary processes described above to generate interface elements representative of each of the obligations selected for resolution (e.g., the outstanding Rogers™ Communication wireless bill, Visa™ credit card bill, mortgage payment, and Toronto Hydro™ bill). Additionally, and as described above, interface generation module 204 may also establish element sizes for each of the generated interface elements (e.g., based on a scaling of a predetermined element size in accordance with the dimensions of the display-unit surface), and establish values of one or more presentation characteristics, such as user-specified or predetermined elements colors, fonts or shadings.

Further, and in addition to the interface elements described above, which represent the one or more obligations elected by user 101 for resolution, interface generation module 104 may also perform operations that generate one or more additional interface elements that, when presented within an additional GUI, establish a timeline of dates and/or times available for resolving the selected obligations, and enable user 101 to view temporal relationships between the scheduled resolutions and other events that impact user 101, such as scheduled distributions of wages by a payroll system (e.g., one or third-party systems 140). In one aspect, interface generation module 204 may access data repository 104 (e.g., as stored within one or more tangible, non-transitory memories by device 102) and obtain calendar data 402, which identifies one or more dates and/or times that are available for resolving the selected obligations. Interface generation module 204 may, in some instances, select a subset of the available dates or times for presentation within the additional GUI, and generate additional temporal interface elements that correspond to each of the selected subset of the available dates or times.

For example, interface generation module 204 may perform operations that establish a current date, e.g., Nov. 29, 2016, and select a subset of available dates for presentation within the additional GUI that include, but are not limited to, November $29^{th}$, November $30^{th}$, December $1^{st}$, and December $2^{nd}$. Interface generation module 204 may, in some aspects, generate temporal interface elements that correspond to each of the subset of the available dates. Additionally, and as described above, interface generation module 204 may also establish element sizes for each of the generated temporal interface elements (e.g., based on a scaling of a predetermined element size in accordance with the dimensions of the display-unit surface), and establish values of one or more presentation characteristics of the temporal interface elements, such as user-specified or predetermined elements colors, fonts or shadings.

In further aspects, interface generation module 204 may perform any of the exemplary processes described above to map the generated obligation-based and temporal interface elements to corresponding positions within the additional GUI, and thus, to corresponding presentation positions within display-unit surface 110. In some aspects, interface generation module 204 may generate data, e.g., interface data 404, that includes the generated obligation-based and temporal interface elements (and data specifying the established sizes and values of presentation characteristics) and mapping data that correlates the generated obligation-based and temporal interface elements to corresponding presentation positions on display-unit surface 110 and within the additional GUI.

Interface generation module 204 may provide interface data 404 to display unit 206A, which may render the generated obligation-based and temporal interface elements for presentation to user 101 within the additional GUI, e.g., GUI 406. As described below, in response to the presentation of GUI 406, user 101 may provide input data, e.g., input 408, to device 102 through input unit 206B (e.g., touch-based input provided to the display-unit surface of the pressure-sensitive, touchscreen interface unit). In some aspects, input 408 may reflect a selective manipulation of the positions of one or more of the interface elements within presented GUI 406 by user 101, and a scheduling module 410 of device 102 may process input 408, either alone or in conjunction with mapping data 409, to characterize the selective manipulation of the one or more interface elements. Based on the characterization, scheduling module 210 may identify one of the available dates selected by user 101 for resolution of each of the selected obligations, e.g., the outstanding Rogers™ Communication wireless bill, Visa™ credit card bill, mortgage payment, and Toronto Hydro™ bill.

Figure 5A:
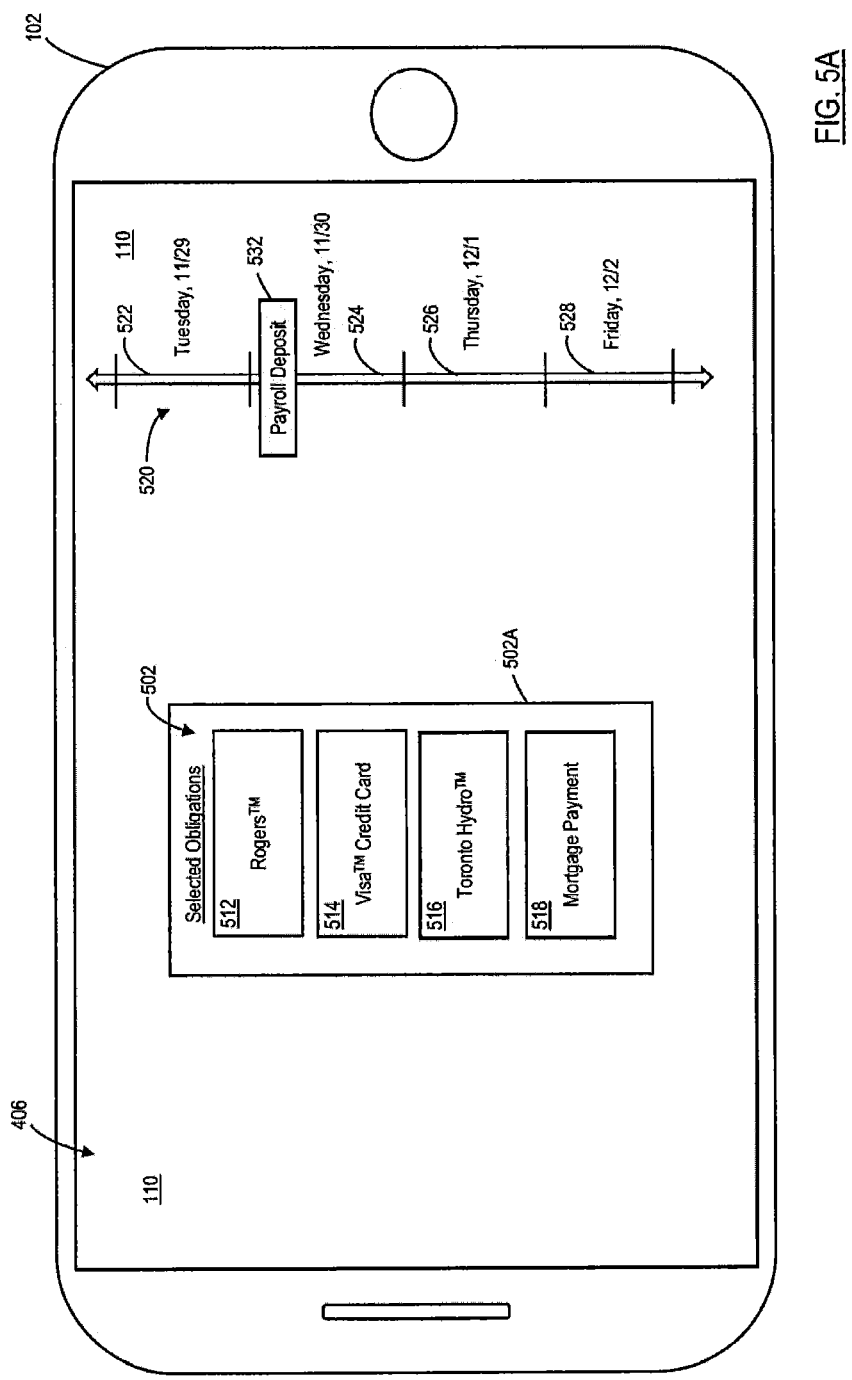
FIGS. 5A-5E are diagrams of exemplary graphical user interfaces, consistent with the disclosed embodiments.

For example, as illustrated in FIG. 5A, device 102 may present GUI 406 through display unit 206A, which may correspond to the pressure-sensitive, touchscreen display unit having display-unit surface 110. In some aspects, presented GUI 406 may include interface elements 512, 514, 516, and 518, each of which correspond to one or the obligations selected by user 101 for resolution in accordance with the disclosed embodiments (e.g., within GUI 207 of FIGS. 3A-3C). For example, interface element 512 may represent the wireless bill generated by Rogers™ Communications, which may be associated with a $45 monthly service fee and a due date of Nov. 27, 2016, and interface element 514 may represent the outstanding Visa™ credit-card bill, which may be associated with a minimum payment of $85 due on or before Nov. 30, 2016. Further, and by way of example, interface element 516 may represent the outstanding electric bill generated by Toronto Hydro™, which may obligate user 101 to remit a $30 payment on or before Dec. 2, 2016, and interface element 518 may represent the recurring monthly mortgage payment of $2,850, which is due one or before Dec. 10, 2016. The disclosed embodiments are not limited to these exemplary interface elements and corresponding obligations, and in further aspects, GUI 406 may include interface elements associated with any additional or alternate obligation selected for resolution by user 101, as described above.

GUI 406, when presented to user 101 through display unit 206A, may also include temporal interface elements 522, 524, 526, and 528, each of which may represent a date or time available for resolving one or more of the user-specified obligations described above. For example, temporal interface element 522 may represent an available resolution date of November $29^{th}$, temporal interface element 524 may represent an available resolution date of November $30^{th}$, temporal interface element 526 may represent an available resolution date of December $1^{st}$, and temporal interface element 528 may represent an available resolution date of December $2^{nd}$. The disclosed embodiments are, however, not limited these exemplary dates, or to these exemplary number of available dates, and in other aspects, GUI 406 may include temporal elements representative of any additional or alternate number of dates available to resolve the user-specified obligations.

Further, and as illustrated in FIG. 5A, temporal interface elements 512, 516, 518, and 520 may be arranged within GUI 406 to form a contiguous timeline 520 disposed along a lateral edge of GUI 406. In certain aspects, when presented to user 101 through GUI 406, timeline 520 may enable user 101 to visualize temporal relationships between the scheduled resolutions and other events that impact user 101, such as scheduled distributions of wages by a payroll system (e.g., one or third-party systems 140). For example, and as described above, interface generation module 204 may obtain, from a corresponding one of third-party systems 140 associated with a payroll service, event data that identifies a scheduled distribution of wages into financial services account of user 101 on Nov. 30, 2016, and may generate an event-based interface element 532 that represents the scheduled distribution of wages. In some aspects, as depicted in FIG. 5A, display unit 206A may present event-based interface element 532 at a position on timeline 520 that corresponds to the scheduled November $30^{th}$ distribution, e.g., at a position coincident with temporal interface element 524 along timeline 520.

Additionally, as illustrated in FIG. 5A, interface elements 512, 514, 516, and 518 may be disposed within a portion 502 of GUI 406 defined by interface-portion boundary 502A, and which interface generation module 204 may associate with those obligations selected by user 101 for resolution. In some aspects, to schedule the obligations associated with presented interface elements 512, 514, 516, and 518 for resolution on corresponding ones of the available dates, user 101 may provide input to device 102, through input unit 206B, that reflects a movement of each of elements 512, 514, 516, and 518 from an initial position within interface portion 502 to a subsequent position coincident with or occupied by a corresponding one of temporal interface elements 522, 524, 526, and 528. These exemplary processes, and other described herein, may be implemented by device 102 in addition to or an alternate to processes that require user 101 interact with and navigate through multiple, hierarchical menus to schedule obligations for resolution.

Figure 5B:
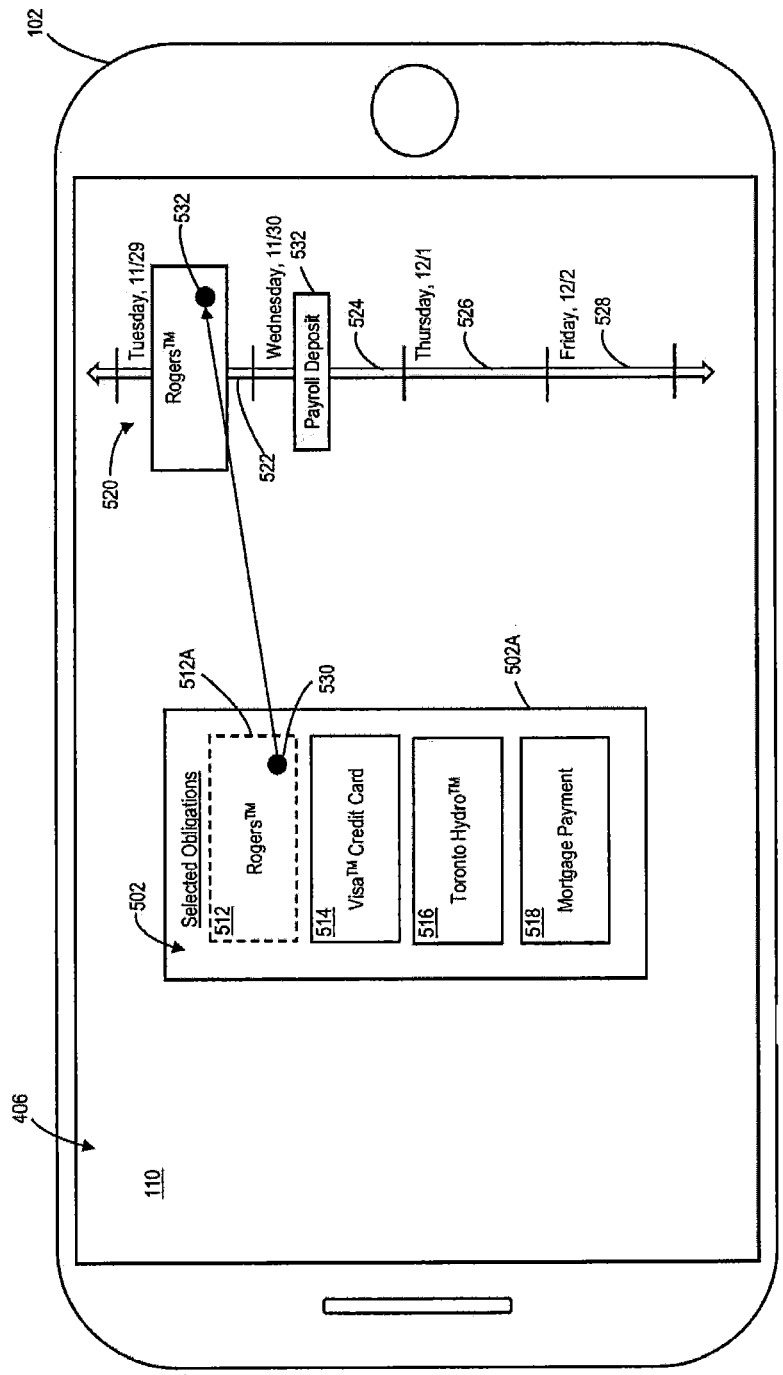

For example, user 101 may intend to schedule the wireless bill generated by Rogers™ Communications for resolution on November $29^{th}$, which represents the earliest date on timeline 520 available for resolving the specified obligations. To select the wireless bill generated by Rogers™ Communication for resolution on November $29^{th}$, user 101 may provide input, to device 102 through input unit 206B, that selects the interface element associated with the Rogers™ Communication wireless bill, e.g., interface element 512, and that moves interface element 512 from its initial position within interface portion 502 to a subsequent position within GUI 406 that coincides with or is occupied by temporal interface element 522, which represents the available resolution date of November $29^{th}$. For example, as illustrated in FIG. 5B, user 101 may select interface element 512 by establishing contact between a finger and a portion of display-unit surface 110 enclosed by a boundary 512A of interface element 512 (e.g., at a first contact position 530).

While maintaining contact with display-unit surface 110, user 110 may slide the finger across display-unit surface 110 to a second contact position 532, at which time user 101 may release the contact between the finger and display-unit surface 110. In some aspects, and as illustrated in FIG. 5B, the translation of user 101's finger across display-unit surface 110 from first contact position 530 to second contact position 532 may correspond to a movement of interface element 512 from a position within interface portion 502 to a subsequent position at which interface element 512 overlaps or coincides with at least a portion of temporal interface element 522, and may indicate an intention of user 101 to schedule a resolution of the Rogers™ Communication bill on November $29^{th}$, which as described above, corresponds to the available resolution date represented by temporal interface element 522.

Figure 5C:
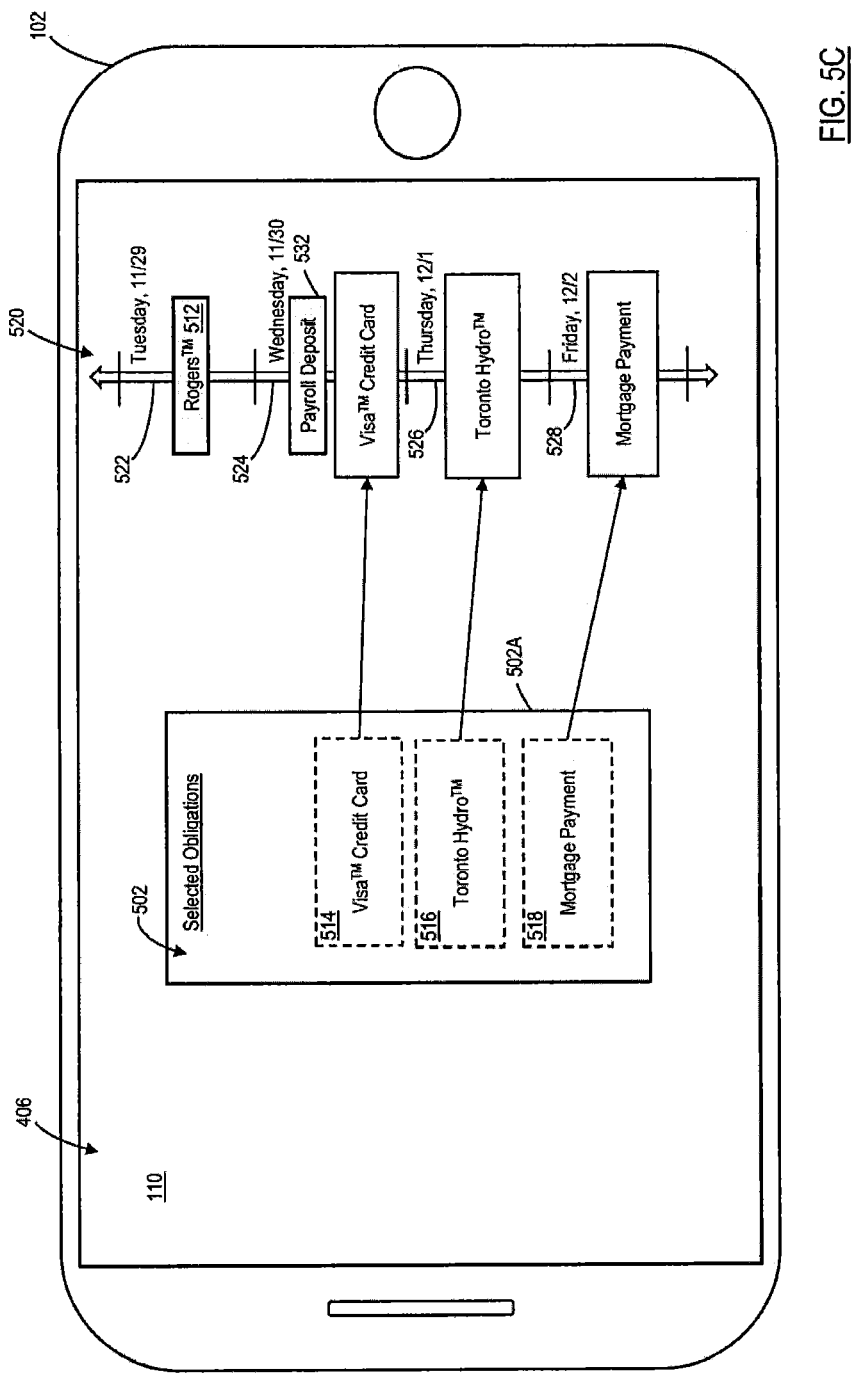

User 101 may also intend to schedule the outstanding Visa™ credit card bill (e.g., associated with a minimum payment of $85 due by November $30^{th}$) for resolution on its due date of November $30^{th}$, to schedule the Toronto Hydro™ electric bill (e.g., associated with a $30 payment due on December $2^{nd}$) for resolution on December $1^{st}$, and further, to schedule the mortgage payment (e.g., a $2,850 payment due by December $10^{th}$) for resolution on December $2^{nd}$. In some aspects, depicted in FIG. 5C, user 101 may provide, to device 102 through input unit 206B, any of the exemplary input described above to move interface elements 514, 516, and 518, which correspond respectively to the outstanding Visa™ credit card bill, Toronto Hydro™ electric bill, and mortgage payment, from their initial positions within interface portion 502 to positions within GUI 406 that coincide with, or overlap, portions of temporal interface elements 524, 528, and 528.

Figure 5D:
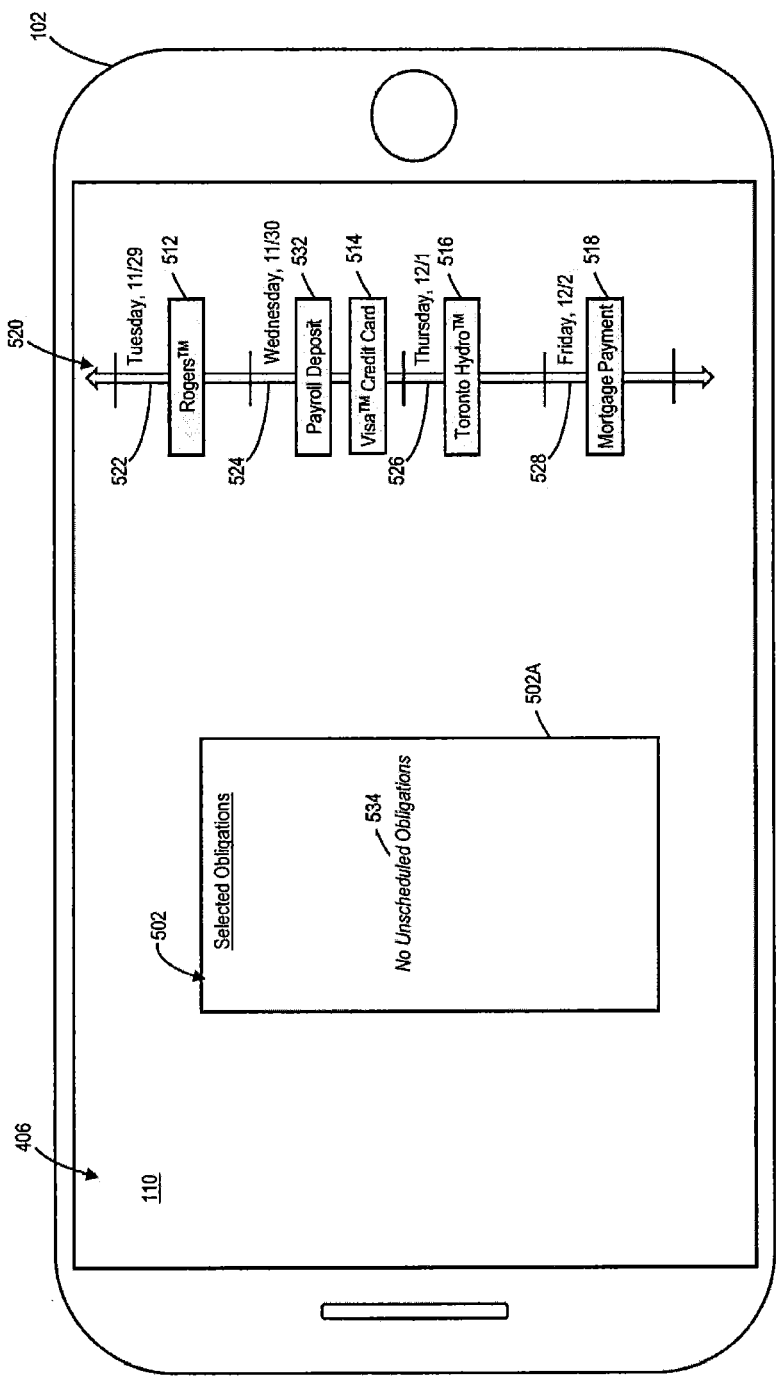

In response to the provided input, display unit 206A may present interface elements 512, 514, 516, and 518 at the positions with GUI 406 that coincide with, or overlap with, portions of temporal interface elements 522, 524, 526, and 528 that represent the scheduled resolution dates for the underlying obligations. For example, and referring to FIG. 5D, display unit 206A may present interface element 512, which represents the Rogers™ Communications wireless bill, at a position within GUI 406 that coincides portion of temporal interface element 522, which represents the scheduled resolution date of November $29^{th}$. As further illustrated by FIG. 5D, display unit 206A may present interface element 514, which represents the Visa™ credit card bill, at a position within GUI 406 that coincides with a portion of temporal interface element 524, which represents the scheduled resolution date of November $30^{th}$, and is proximate to presented interface element 532, which represents the distribution of wages scheduled for November $30^{th}$. Additionally, and as illustrated in FIG. 5D, display unit 206A may present interface element 516, which represents the Toronto Hydro™ bill, at a position within GUI 406 that coincides with portion of temporal interface element 526, which represents the scheduled resolution date of December $1^{st}$, and may present interface element 518, which represents the mortgage bill, at a position within GUI 406 that coincides with a portion of temporal interface element 528, which represents the scheduled resolution date of December $2^{nd}$. In further instances, and responsive to the scheduled obligations, interface generation module 204 may generate an additional interface element indicative of a lack of unscheduled, user-selected obligations, and as illustrated in FIG. 5D, display unit 206A may present the newly generated interface element, e.g., interface element 534, within interface portion 502.

Referring back to FIG. 4, input unit 206B may capture data (e.g., input data 408) corresponding to the input provided by user 101 to device 102, and may provide captured input data 408 to a scheduling module 410 of device 102. Scheduling module 410 may also obtain, from interface generation module 204, mapping data 409 that maps generated interface elements to corresponding positions within GUI 406 and thus, corresponding positions within display-unit surface 110. Based on portions of input data 408 and mapping data 409, scheduling module 410 may perform operations that determine the input provided by user 101 represents a movement of interface elements 512, 514, 516, and 518 within GUI 406 from the initial positions within interface portion 502 to the subsequent positions that coincide with corresponding ones of temporal interface elements 522, 524, 526, and 528 along timeline 520, and thus reflects an intention of user 101 to schedule the obligations associated with 512, 514, 516, and 518 for resolution on available dates associated with corresponding ones of temporal interface elements 522, 524, 526, and 528.

By way of example, and in reference to interface element 512 of FIG. 5B, scheduling module 410 may perform operations that process obtained mapping data 409 to establish a disposition of first contact position 530 within boundary 512A of interface element 512, and further, to compute a displacement between first contact position 530 and one or more points disposed along boundary 512A, such as corners of boundary 512 (e.g., as measured in pixels or other units of measure). In further instances, and based on the computed displacements, scheduling module 410 may perform operations that reconstitute boundary 512 about second contact position 532 (e.g., by determine the positions of the one or more points along boundary 512 relative to second contact position 532 based on corresponding ones of the computed displacements). Scheduling module 410 may access portions of obtained mapping data that establish a boundary of temporal interface elements 522, 524, 526, and 528 along display-unit surface 110, and determine whether reconstituted boundary 512 intersects the established boundary of a corresponding one of temporal interface elements 522, 524, 526, and 528.

In one instance, scheduling module 410 may determine that reconstituted boundary 512 intersects the boundary of temporal interface element 522, and that moved interface element 512 coincides with a portion of temporal interface element 522, which represents an available resolution date of November 29$^{th}$. Based on this determination, selection module 410 may establish that input data 408 reflects a request by user 101 to schedule the resolution of the Rogers™ Communication wireless bill (e.g., as represented by interface element 512) on November 29$^{th}$ (e.g., as represented by temporal interface element 522). In some aspects, scheduling module 410 may perform additional operations that store data identifying the scheduled obligation (e.g., the Rogers™ Communication wireless bill), the scheduled resolution date (e.g., November 29$^{th}$) and one or more obligation parameters (e.g., the billed amount of $45 and the due date of November 27$^{th}$) in a portion of a data repository 104 maintained within one or more tangible, non-transitory memories, e.g., as scheduling data 212.

Additionally, scheduling module 410 may apply any of the exemplary processes described above to portions of input data 408 and mapping data 409 to determine that the input provided by user 101 reflects a movement of interface elements 514, 516, and 518 from interface portion 502 to positions within GUI 406 that overlap portions of corresponding ones of temporal interface elements 524, 526, and 529 (e.g., representing, respectively, available resolution dates of November 30$^{th}$, December 1$^{st}$, and December 2$^{nd}$). Based on this determination, selection module 410 may establish that input data 408 reflects a request by user 101 to schedule the resolution of the outstanding Visa™ credit card bill, Toronto Hydro™ electric bill, and mortgage payment (e.g., as represented by interface elements 524, 526, and 528) on corresponding available resolution dates of November 30$^{th}$, December 1$^{st}$, and December 2$^{nd}$ (e.g., as represented by temporal interface elements 524, 526, and 528). In some aspects, scheduling module 410 may perform additional operations that store data identifying the scheduled obligations (e.g., the outstanding Visa™ credit card bill, Toronto Hydro™ electric bill, and mortgage payment), the scheduled resolution dates (e.g., November 30$^{th}$, December 1$^{st}$, and December 2$^{nd}$), and one or more corresponding obligation parameters (e.g., the obligation amounts and due dates described above) in as portions scheduling data 212 within data repository 104.

In some embodiments, the presentation of interface elements representative of scheduled resolutions of obligations and scheduled occurrences of events impacting user 101 within a single timeline, e.g., timeline 520 of FIGS. 5A-5D, may enable user 101 to visualize, in real time, temporal relationships between the scheduled resolutions and other events that impact user 101 within a single GUI. In additional aspects, and consistent with the disclosed embodiments, display unit 206A may present additional or alternate interface elements within timeline 520 that visually convey not only the scheduling of outstanding obligations for resolution on corresponding available dates, but also a relationship of these scheduled resolution dates to due dates or deadlines associated with the underlying obligations.

Figure 5E:
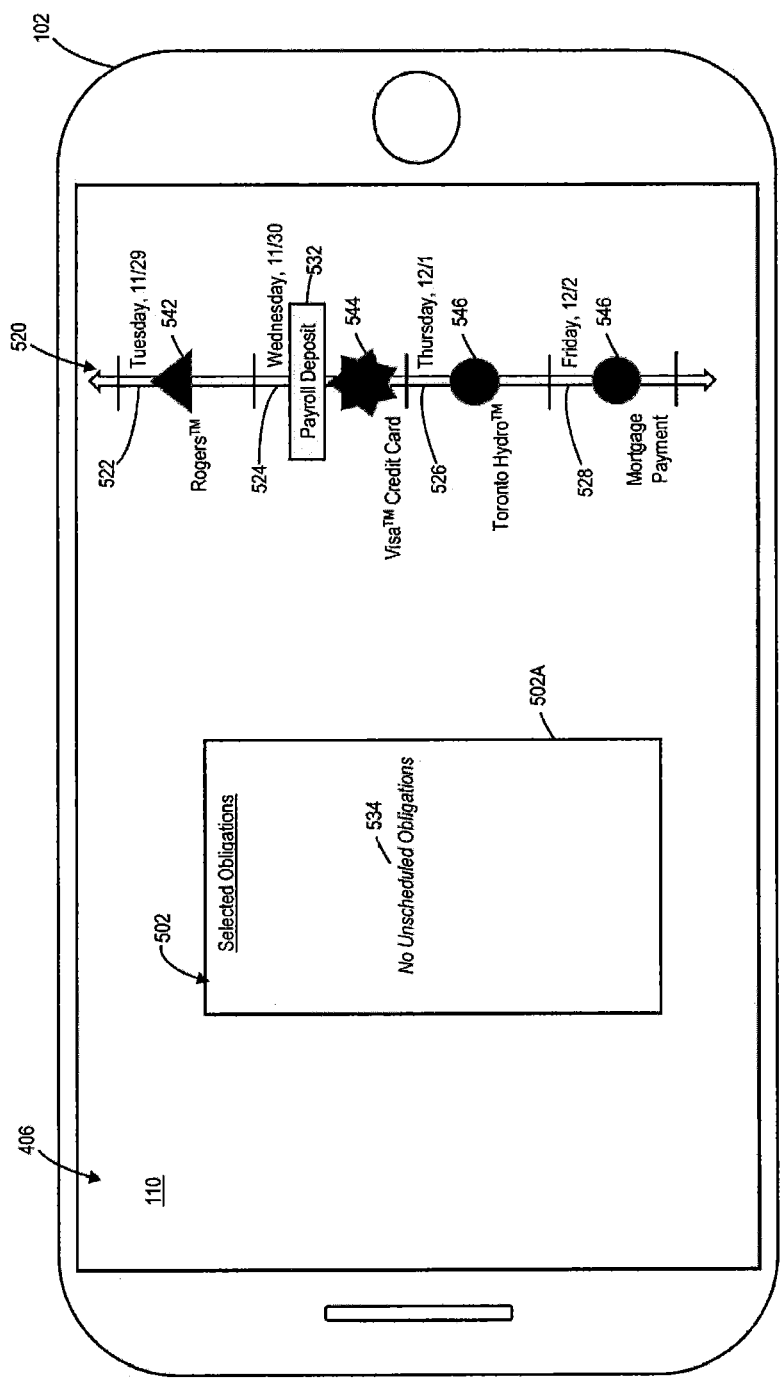

For example, and as described above, user 101 may provide input to device 102 that schedules the wireless bill generated by Rogers™ Communications for resolution on November 29$^{th}$, which falls subsequent to the November 27$^{th}$ due date of the wireless bill. The wireless bill, in some instances, is past-due at the scheduled resolution, and interface generation module 204 may perform operations that generate and assign, to the Rogers™ Communications wireless bill, and thus, to interface element 512, an additional interface element having visual characteristics that, when presented within GUI 406, convey the past-due status of the scheduled resolution. For example, the additional interface element, e.g., an icon, may be associated with a predetermined or user-specified shape and/or color indicative of the past-due status of the wireless bill, e.g., a red, equilateral triangle. Referring to FIG. 5E, display unit 206A may replace interface element 512, which corresponds to the wireless bill generated by Rogers™ Communications, with the additional interface element, e.g., icon 542, that visually conveys the past-due status of the wireless bill to user 101, and may present icon 542 at a position within GUI 406 associates with interface element 512 (e.g., overlapping a portion of temporal interface element 522 within timeline 520).

Similarly, interface generation module 206 may perform additional operations that generate and assign, to the outstanding Visa™ credit card bill, Toronto Hydro™ bill, and mortgage payment (and thus, to interface elements 514, 516, and 518), additional interface elements, e.g., icons, having visual characteristics that, when presented within GUI 406, visually convey to user 101 the status of these obligations at the scheduled resolution dates. For example, interface generation module 204 may establish, based on stored obligation data 212, that user 101 scheduled resolution of the outstanding Visa™ credit card bill on its due date of November 30$^{th}$, and may assign to the outstanding Visa™ credit card bill (and to interface element 514) an icon 544 having a predetermined or user-specified shape and/or color indicative of the current status of the outstanding Visa™ credit card bill, e.g., a blue star. Interface generation module 204 may also establish that the scheduled resolution dates for the Toronto Hydro™ bill and mortgage payment (e.g., December 1$^{st}$ and December 2$^{nd}$, respectively) fall prior to the due dates for these obligations (e.g., December 2$^{nd}$ and December 10$^{th}$, respectively) and may assign to the Toronto Hydro™ bill and mortgage payment (and to interface elements 516 and 518) an icon 546 having a predetermined or user-specified shape and/or color indicative of the future status of the outstanding Toronto Hydro™ bill and mortgage payment, e.g., a green circle.

Referring to FIG. 5E, display unit 206A may replace interface element 514, which represents the outstanding Visa™ credit card bill with icon 544, e.g., the blue star, that visually conveys the current status of the outstanding Visa™ credit card bill to user 101, and may present icon 544 at a position within GUI 406 associates with interface element 514 (e.g., overlapping a portion of temporal interface element 524 within timeline 520). Similarly, display unit 206A may replace each of interface elements 516 and 518, which represent the outstanding Toronto Hydro™ bill and mortgage payment, with icon 546, e.g., the blue star, that visually conveys the future status of the outstanding Toronto Hydro™ bill and mortgage payment bill to user 101, and may present icon 546 at a position within GUI 406 associated with interface elements 516 and 518 (e.g., overlapping corresponding portions of temporal interface element 526 and 528 within timeline 520). The disclosed embodiments are, however, not limited to these exemplary interface-shapes and colors, and in other aspects, interface generation module 204 may generate and assign additional interface elements having any additional or alternate visual characteristic that, when presented by GUI 408, visually conveys to user 101 a relationship between the schedules resolution dates and the due dates associated with the obligations.

In further embodiments, and upon scheduling the outstanding Rogers™ Communication wireless bill, Visa™ credit card bill, Toronto Hydro™ bill, and mortgage payment, device 102 may be configured to generate, and present to user 101 through display unit 206A, an additional graphical user interface (GUI) that, in response to input provided to input unit 206B that manipulates one or more presented interface elements, enables user 101 to assign one or more sources of funding, such as payment instruments held by and available to user 101, to corresponding ones of the obligations. For example, user 101 may intend to fund the scheduled resolutions of the obligations using the assigned payment instruments, and in response to the received input, device 102 may be configured to associate the assigned payment instruments with the obligations and their scheduled resolutions, and further, transmit data to one or more network-connected computer systems to initiate the resolution of the obligations using the assigned payment instruments and in accordance with the established schedule.

In some instances, interface generation module 204 of FIG. 4 may perform operations that request data identifying one or more payment instruments held by and available to user 101 from one or more network-connected computing systems, such as those maintained by financial institutions that issue the payment instruments held by the user 101. In other aspects, and consistent with the disclosed embodiments, interface generation module 204 may obtain portions of the data identifying the payment instruments from one or more locally accessible data repositories (e.g., data repository 104), such as those populated by payment-service applications that establish and maintain a digital wallet on device 102. Examples of these payment instruments may include, but are not limited to, credit and debit card accounts held by 101 of the device and issued by one or more financial institutions (e.g., issuers), checking, savings, or brokerage accounts held by user 101, electronic funds transfers (e.g., e-transfers), and units of one or more digital currencies held by the customer in one or more corresponding accounts (e.g., units of Bitcoin™, Litecoin™, etc.) held by user 101.

By way of example, and in response to the transmitted request, interface generation module 204 may request and receive payment data identifying one or more payment instruments from financial-institution system 130, and the received data may identify, as available payment instruments, checking, savings, and brokerage accounts held by the financial institution associated with financial-institution system 130 on behalf of user 101, a MasterCard™ credit card account held by user 101 and issued by the financial institution, and an account holding units of the digital currency, e.g., Bitcoin™, owned by user 101. The received payment data may also include account data characterizing and specifying each of the available payment instruments, which may include, but is not limited to, account numbers, card security codes (CSCs), expiration dates, bank routing numbers, issuer identification numbers (IINs), and names and addresses of account holders associated with the available payment instruments.

In some aspects, and using any of the exemplary processes described above, interface generation module 204 may perform operations that generate interface elements representative of each of the available payment instruments, and map the generated interface elements to corresponding position within a graphical user interface (GUI), which device 102 may present to user 101 through display unit 206A. Further, and as described above interface generation module 204 may generate interface data that characterizes the generated interface elements and includes the generated mapping data, which correlates the generated interface elements to corresponding presentation positions within the display-unit surface and as such, within the presented GUI. Interface generation module 204 may provide interface data 205 to display unit 206A, which may render the generated interface elements for presentation to user 101 within the GUI 406.

In response to the presentation of the GUI, user 101 may provide input data to device 102 through input unit 206B (e.g., touch-based input provided to the display-unit surface of the pressure-sensitive, touchscreen interface unit). In some aspects, input 408 may reflect a selective manipulation of the positions of one or more interface elements within presented GUI by user 101, and scheduling module device 102 may process input 408, either alone or in conjunction with mapping data 409, to characterize the selective manipulation of the one or more interface elements using any of the exemplary processes described above. In an embodiment, and based on the characterization of the selective manipulation, scheduling module 210 may identify one or more of the payment instruments selected by user 101 to fund the scheduled resolutions of the selected obligations, and may perform operation that, in conjunction with one or more network-connected systems, initiate the resolution of the obligations in accordance with the established resolution schedule and the user-selected payment instruments or funding source.

Figure 6A:
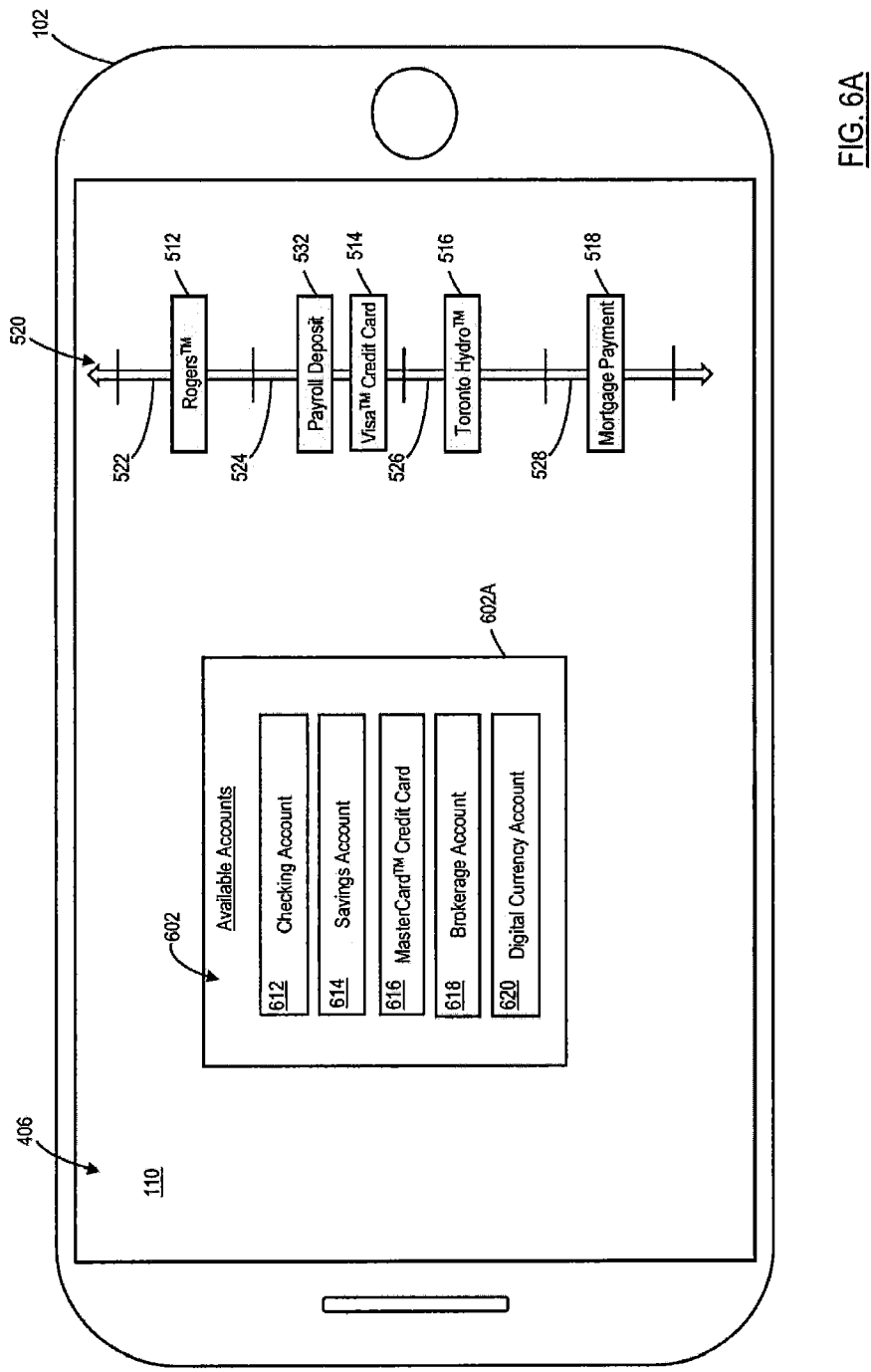
FIGS. 6A-6C are diagrams of exemplary graphical user interfaces, consistent with the disclosed embodiments.

For example, as illustrated in FIG. 6A, device 102 may present a GUI, such as GUI 406 described above, to user 101 through display unit 206A, which may correspond to a LCD unit having a display-unit surface 110. In some aspects, presented GUI 406 may include interface elements 612, 614, 616, 618, and 620, each of which may correspond to a payment instrument held by user 101 and available the scheduled resolution of the selected obligations. For example, interface elements 612 and 614 may represent, respectively, checking and savings accounts held by user 101 at the financial institution associated with financial-institution system 130, interface element 616 may represent the MasterCard™ credit card account held by user 101 and issued by the financial institution, and interface element 618 may represent a brokerage account held by user 101 at the financial institution. Additionally, in some instances, interface element 620 may represent a digital-currency account held by user 101, which holds one or more units of a digital currency, e.g., Bitcoin™, available for use in resolving one or more of the selected obligations. The disclosed embodiments are not limited to these exemplary payment instruments and funding sources, and in further aspects, GUI 406 may include interface elements representative of any additional or alternate payment instrument or funding source held by user 101 and available for use in the resolution of the selected obligations.

Further, as illustrated in FIG. 6A, interface elements 612, 614, 616, 618, and 620 may be disposed within a portion 602 of GUI 406 defined by interface-portion boundary 602A, and which interface generation module 204 may associate with payment instruments available for use in scheduled resolutions. For example, and as illustrated in FIG. 6A, interface portion 602 may replace interface portion 502 within GUI 406 (e.g., as described above in reference to FIG. 5D) with interface portion 602, and with interface elements 612, 614, 616, 618, and 620, upon receipt of input that schedules all of the outstanding obligations selected by user 101 (e.g., the outstanding Rogers™ Communication wireless bill, Visa™ credit card bill, Toronto Hydro™ electric bill, and mortgage payment). In other aspects, not depicted in FIG. 6A, GUI 406 may include both interface portions 502 and 602 within a single viewing pane.

As described above, presented GUI 406 may also include a timeline 502 that includes temporal interface elements 522, 524, 526, and 528, which correspond to available resolution dates of November 29$^{th}$, November 30$^{th}$, December 1$^{st}$, and December 2$^{nd}$, and which enables user 101 to visualize the temporal relationships between the scheduled resolutions and other events that impact user 101, such as scheduled distributions of wages by a payroll system (e.g., one or third-party systems 140). For example, and as illustrated in FIG. 6A, interface element 512 may be disposed at a position within GUI 406 that coincides with a portion of temporal interface element 522, which establishes user 101's intention to schedule the resolution of the outstanding Rogers™ Communication wireless bill on November 30$^{th}$. Additionally, interface element 514 may be disposed at a position within GUI 406 that coincides with a portion of temporal interface element 524, interface element 516 may be disposed at a position within GUI 406 that coincides with a portion of temporal interface element 526, interface element 518 may be disposed at a position within GUI 406 that overlaps a portion of temporal interface element 528, which collectively establish user 101's intention to schedule the resolution of the outstanding Visa™ credit card bill on November 30$^{th}$, the resolution of the outstanding Toronto Hydro™ electric bill on December 1$^{st}$, and the resolution of the outstanding mortgage payment on December 2$^{nd}$. Additionally, and as described above, GUI 406 may also present interface element 532 at a position that coincides with a portion of temporal interface element 524, which reflects a scheduled distribution of wages to a financial services account of user 101 on November 30$^{th}$.

Figure 6B:
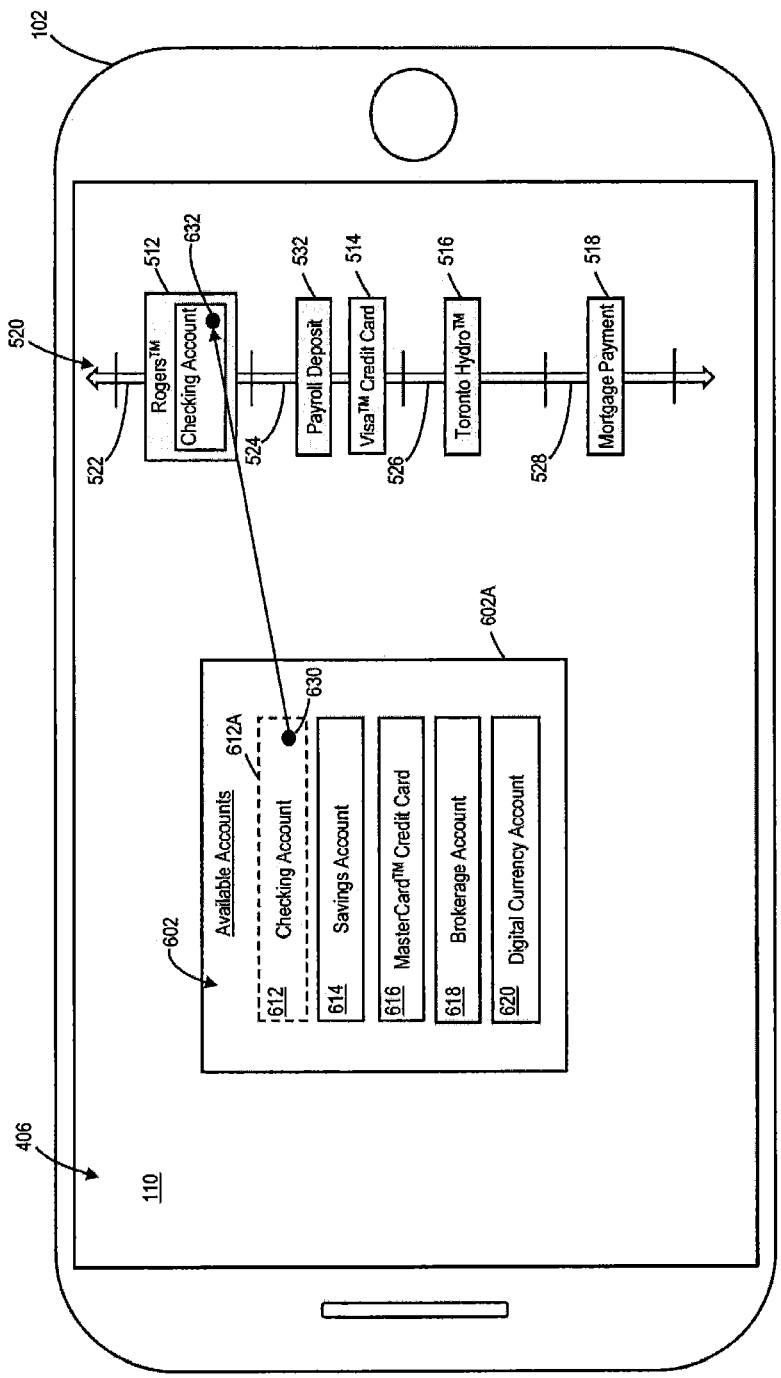

In additional embodiments, to fund a scheduled resolution of an outstanding obligation, user 101 may provide input to device 102, through input unit 206B, that reflects a movement of a corresponding one of interface elements 612, 614, 616, 618, and 620 from an initial position within interface portion 602 to a subsequent position within GUI 406 that overlaps at least a portion of an interface element associated with the outstanding obligation within timeline 520, as described below in reference to FIG. 6B. In some aspects, the provided input may reflect an intention of user 101 to fund the scheduled resolution of the outstanding obligation using the payment instrument represented by the corresponding one of interface elements 612, 614, 616, 618, and 620. These exemplary funding processes, and other described herein, may be implemented by device 102 in addition to or an alternate to funding processes that require user 101 interact with and navigate through multiple, hierarchical menus to schedule and fund obligations for subsequent or concurrent resolution.

For example, user 101 may determine to fund the scheduled resolution of the wireless bill generated by Rogers™ Communications on November 29$^{th}$ using the checking account held by user 101 at the financial institution. To fund the resolution of the Rogers™ Communication wireless bill using the checking account, user 101 may provide input, to device 102 through input unit 206B. that selects the presented interface element associated with the checking account, e.g., interface element 612, and that moves interface element 612 from its initial position within portion 602 to a subsequent position within GUI 406 that overlaps a portion of interface element 512 along timeline 520, which represents the scheduled resolution of the Rogers™ Communication wireless bill on November 29$^{th}$.

For example, as illustrated in FIG. 6B, user 101 may select interface element 612 by establishing contact between a finger and a portion of display-unit surface 110 enclosed by a boundary 612A of interface element 612 (e.g., at a first contact position 630). While maintaining contact with display-unit surface 110, user 110 may slide the finger across display-unit surface 110 to a second contact position 632, at which time user 101 may release the contact between the finger and display-unit surface 110. In some aspects, and as illustrated in FIG. 6B, the translation of user 101's finger across display-unit surface 110 from first contact position 630 to second contact position 632 may correspond to a movement of interface element 612 from a position within interface portion 502 to a subsequent position at which interface element 612 overlaps or is included within at least a portion of interface element 512 along timeline 520. The movement of interface element 612 may, in some instances, indicate an intention of user 101 to fund the November 29$^{th}$ resolution of the Rogers™ Communication bill using the checking account, which as described above, corresponds to interface element 612.

User 101 may also determine to fund the November 30$^{th}$ resolution of the outstanding Visa™ credit card bill using the checking account, to fund the December 1$^{st}$ resolution of the Toronto Hydro™ electric bill using the MasterCard™ credit card account, and to fund the December 2$^{nd}$ resolution of the mortgage payment using the brokerage account. Additionally, user 101 may elect to deposit the funds associated with the November 30$^{th}$ distribution of wages (e.g., an event impacting user 101, as represented by interface element 532 along timeline 520) into the checking account.

Figure 6C:
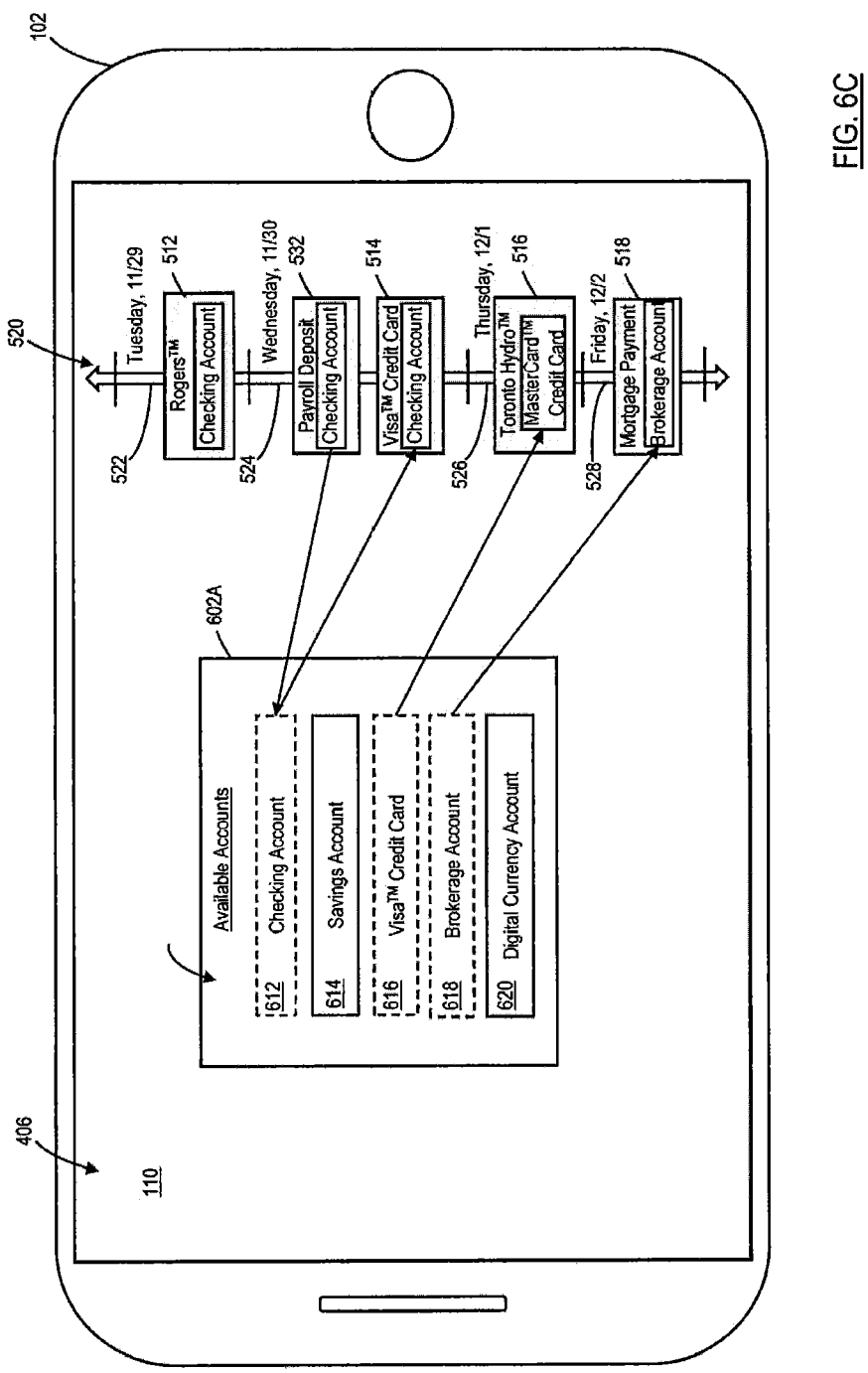

In some aspects, depicted in FIG. 6C, user 101 may provide, to device 102 through input unit 206B, any of the exemplary input described above to: move interface element 612, which represents the available checking account, from its initial position within interface portion 602 to a position within GUI 406 that overlap or are included within corresponding ones of interface elements 514 and 532; move interface element 616, which represents the available MasterCard™ credit card account, from its initial position within interface portion 602 to a position within GUI 406 that overlaps or is included within interface element 516; and move interface element 618, which represents the available brokerage account, from its initial position within interface portion 602 to a position within GUI 406 that overlaps or is included within interface element 518. As described above, the provided input may indicate an intention of user 101 to fund the scheduled resolution of the outstanding Visa™ credit card bill (e.g., represented by interface element 514) using the available checking account, to deposit funds from the scheduled wage distribution (e.g., represented by interface element 532) into the available checking account, to fund the resolution of the Toronto Hydro™ electric bill (e.g., represented by interface element 516) using the MasterCard™ credit card account, and to fund the resolution of the mortgage payment (e.g., represented by interface element 518) using the brokerage account.

In some aspects, input unit 206B may capture data (e.g., input data 408) corresponding to the input provided by user 101 to device 102, and may provide captured input data 408 to scheduling module 410. As described above, scheduling module 410 may also obtain, from interface generation module 204, mapping data 409 that maps generated interface elements to corresponding positions within GUI 406 and thus, corresponding positions within display-unit surface 110. Based on portions of input data 408 and mapping data 409, scheduling module 410 may perform any of the exemplary processes described above to determine that the input provided by user 101 represents a movement of interface element 612 from the initial position within interface portion 602 to the subsequent position within GUI 406 that overlaps or is incorporated within interface element 512, and thus reflects the intention of user 101 to fund the November 29$^{th}$ resolution of the Rogers™ Communications wireless bill using the available checking account. Additionally, scheduling module 410 may apply any of the exemplary processes described above to portions of input data 408 and mapping data 409 to establish the intention of user 101 to fund the scheduled resolution of the outstanding Visa™ credit card bill using the available checking account, to deposit funds from the scheduled wage distribution into the available checking account, to fund the resolution of the Toronto Hydro™ electric bill using the MasterCard™ credit card account, and to fund the resolution of the mortgage payment using the brokerage account.

In some aspects, scheduling module 410 may perform additional operations that store data identifying and characterizing the selected payment instruments (e.g., the account data described above) within a portion of one or more tangible, non-transitory memories, e.g., within data repository 404, and link the structured data records that store the account data characterizing the payment instruments to portions of scheduling data 212 that identify and characterize the obligations and corresponding resolutions funded by selected the payment instruments and funding sources. Additionally, and in further aspects, device 102 may be further configured to transmit data to one or more network-connected computer systems, such as financial-institution system 130 and third-party systems 130, to initiate the resolution of the obligations using the selected payment instruments and/or funding sources and in accordance with the established schedule.

Figure 7:
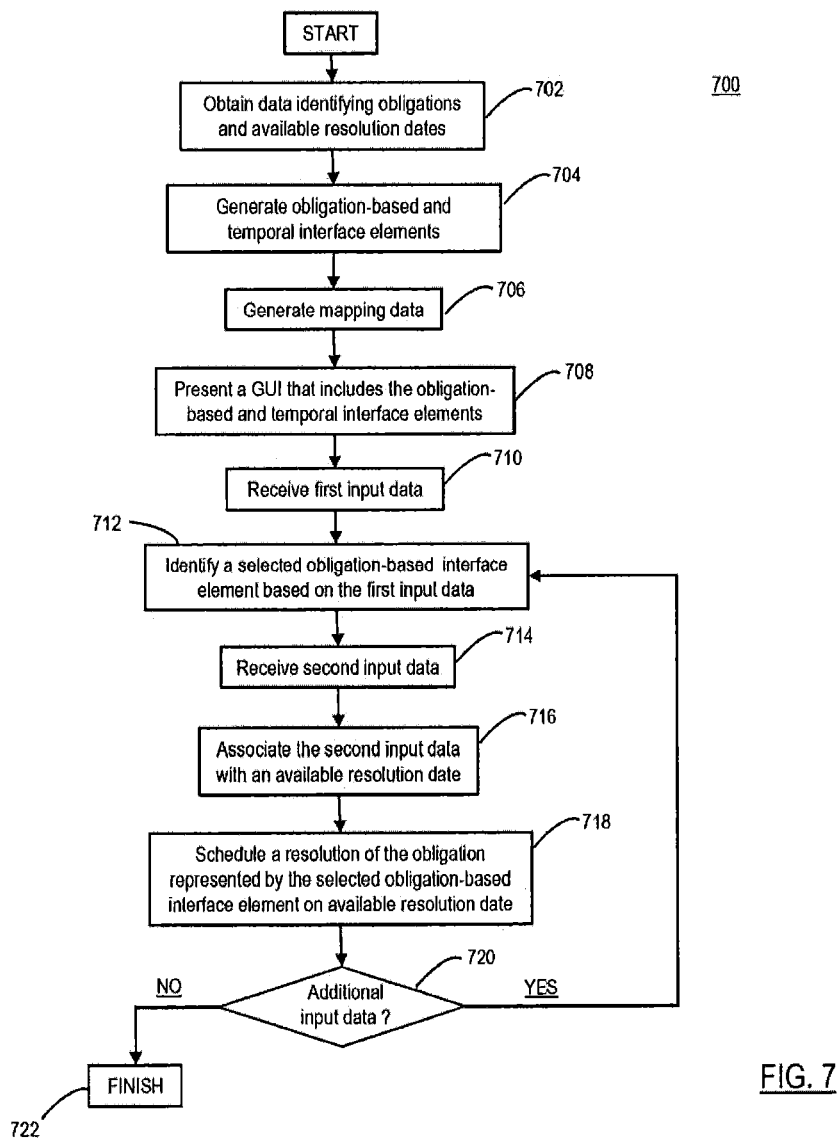
FIG. 7 is a flowchart of an exemplary process for scheduling events using data-aggregating graphical user interfaces, in accordance with the disclosed embodiments.

FIG. 7 is a flowchart of an exemplary process 700 for obtaining scheduling a resolution of one or more outstanding obligations using a single, data-aggregating graphical user interface, in accordance with the disclosed embodiments. In some aspects, a communications device, such as device 102 operated by user 101, may perform the steps of exemplary process 700. For example, and as described above, device 102 may be configured to receive data indicative of obligations held by user 101 and further, dates available to resolve these held obligations. In some aspects, device 102 may be configured to aggregate the received obligation and temporal data into a single graphical user interface (GUI) for presentation through a corresponding display unit, and may receive, through a corresponding input unit, input from user 101 that manipulates certain interface elements presented within the GUI to signal an intention to schedule a resolution of one or more of the obligations on corresponding ones of the available dates. Device 102 may be configured to process the received input data and schedule the one or more obligations for resolution in accordance with the user-specified schedule.

Referring to FIG. 7, device 102 may obtain obligation data identifying one or more obligations held by user 101 and may identify one or more dates available to resolve these obligations (e.g., in step 702). For example, and as described above, an obligation may correspond to an act or course of action to which user 101 is bound to perform by mutual agreement with one or more counterparties, and an outstanding obligation may refer to an obligation that requires an appropriate resolution, e.g., the performance of the corresponding act or course of action by user 101. In one instance, an outstanding obligation may require user 101 to transfer funds to one or more counterparties in exchange for products purchased during a particular prior time period, in exchange for resources consumed during the particular prior time period, or in exchange for serviced rendered by the one or more counterparties during that particular prior time period. By way of example, the required transfer of funds may correspond to a payment transaction initiated by device 102, either alone or in conjunction with other network-connected computer systems, in satisfaction of a bill or an invoice issued by the one or more counterparties, which may be associated with a corresponding payment deadline.

In some aspects, and as described above, device 102 may receive obligation data from one or more network-connected computing systems, such as financial-institution system 130 and third-party systems 140 of FIG. 1, which may generate invoices or bills that impose certain outstanding obligations onto user 101. In other instances, and consistent with the disclosed embodiments, user 101 may receive physical copies of bills or invoices from the financial institution, business entities, governmental entities, or regulatory entities associated with the network-connected computing systems, and device 102 may include a digital camera that, based on input received from user 101, may capture images of the physical copies of the bills and images. Device 102 may, in some aspects, be configured to apply one or more image processing algorithms and optical-character-recognition (OCR) techniques to the captured images to identify and extract corresponding portions of the obligation data from the captured images.

By way of example, the obligation data may identify each of the one or more outstanding obligations, and for each outstanding obligation, specify a unique identifier that associated user 101 with the outstanding obligation (e.g., an account number assigned to user 101 by the financial institution, business entity, governmental entity, and/or regulatory entity), an amount associated with the outstanding obligation, a deadline for resolving the outstanding obligation, and additionally or alternatively, instructions for resolving the outstanding obligation (e.g., instructions for remitting payment, etc.). In other instances, and consistent with the disclosed embodiments, the obligation data may identify one or more events that impact user 101, such as distributions of weekly, bi-weekly, or monthly wages to a financial services account held by user 101, and specify one or more scheduled occurrences of these events (e.g., a scheduled distribution date of the wages) and corresponding event parameters (e.g., an amount of the distributed wages, etc.). For example, one of third-party systems 140 may be associated with a payroll service that manages a distribution of wages to user 101 on a weekly, bi-weekly, or monthly schedule, and device 102 may obtain data identifying the scheduled distributions from the corresponding one of third-party systems 140 using any of the exemplary processes described above.

Device 102 may also be configured to obtain temporal data identifying one or more dates or time available for resolving the obligations held by user 101, e.g., as identified within the obtained obligation data (e.g., in step 702). In some instances, device 102 may be configured to access locally stored data, e.g., stored within one or more tangible, non-transitory memories, that identifies one or more dates and/or times that are available for resolving the user-selected obligations. The accessed data may, for certain instances, be generated by one or more application programs executed by device 102, such as application programs that maintain an electronic calendar on behalf of user 101, and device 102 may select a subset of the available dates or times from the accessed data. For example, and as described above, device 102 may be configured to establish a current date, e.g., Nov. 29, 2016, and select a subset of available dates from the accessed data that include, but are not limited to, November $29^{th}$, November $30^{th}$, December $1^{st}$, and December $2^{nd}$.

Based on portions of the obligation and temporal data, device 102 may be configured to generate interface elements representative of one or more of the outstanding obligations and dates or times available for resolving the one or more outstanding obligations (e.g., in step 704). For example, the one or more outstanding obligations may correspond to a subset of the obligations identified within the received obligation data and selected for resolution by user 101, e.g., using any of the exemplary processes and GUIs described above, For example, in certain instances, user 101 may provide input to device 102 that selects an outstanding Rogers™ Communication wireless bill, an outstanding Visa™ credit card bill, an outstanding mortgage payment, and an outstanding Toronto Hydro™ electric bill for resolution, and device 102 may perform any of the exemplary processes described above to generate interface elements representative of each of the obligations selected for resolution.

Further, and in addition to the interface elements representative of obligations selected by user 101 for resolution, device 102 may also be configured to generate additional interface elements, e.g., temporal interface elements, that, when presented through the display unit, establish a timeline of the available dates and/or times available for resolving the user-selected obligations, and enable user 101 to view temporal relationships between the scheduled resolutions and other events that impact user 101, such as the scheduled distributions of wages. For example, and as described above, the temporal data may specify available dates for resolving the user-selected obligations (e.g., November $29^{th}$, November $30^{th}$, December $1^{st}$, and December $2^{nd}$), and device 102 may be configured in step 704 to generate temporal interface elements corresponding the specified available dates using any of the exemplary processes described above.

Additionally, in some aspects, device 102 may be configured to perform any of the exemplary processes described above to map the generated obligation-based and temporal interface elements to corresponding positions within the GUI, and thus, to corresponding positions on a display-unit surface of a display unit of device 102, such as display-unit surface 110 of display unit 206A described above. (e.g., in step 706). For example, device 102 may be configured to determine a centroid and boundary that define each of the generated obligation-based and temporal interface elements, and to map each of the determined interface-element centroids and boundaries to corresponding spatial positions within the GUI and additionally or alternatively, on the display-unit surface. In some instances, in step 706, device 102 may be configured to generate mapping data that includes the determined interface-element centroids and boundaries, and the mappings of these interface-element centroids and boundaries to the corresponding spatial positions within the GUI and additionally or alternatively, on the display-unit surface.

In some aspects, the display unit of device 102 may render the generated obligation-based and temporal interface elements for presentation to user 101 within the additional GUI, such as GUI 406 of FIGS. 5A-5E (e.g., in step 708). In some aspects, the display unit may arrange the obligation-based and temporal interface elements within the corresponding GUI in accordance with the generated mapping data. Further, and in response to the presented GUI, an input unit of device 102, which may distinct from the display unit or included with the display unit in a corresponding interface unit (e.g., the pressure-sensitive, touchscreen interface unit described above), may receive first input data from user 101 (e.g., in step 710), and based on that input data, identify a selection of one of the obligation-specific interface elements (e.g., in step 712).

For example, and as described above, user 101 may determine to schedule a resolution of the wireless bill generated by Rogers™ Communications for resolution on November $29^{th}$, and user 101 may select an obligation-specific interface element representative of the Rogers™ Communications wireless bill by establishing contact between a finger and a portion of display-unit surface 110 enclosed by a boundary of the obligation-specific interface element (e.g., at a first contact position). In some aspects, in step 712, device 102 may be configured to process the first input data, identify a position within the GUI (and the display-unit surface) that corresponds to the established contact, and based on portions of the generated mapping data, determine that the identified position is disposed within the defined boundary of the obligation-specific interface element representative of the Rogers™ Communications wireless. Based on the determination that the identified position is disposed within the defined interface element boundary, device 102 may be configured to establish that user 101 selected the obligation-specific interface element representative of the Rogers™ Communications wireless.

Additionally, and in further response to the presented GUI, device 102 may receive second input data from user 101 through the input unit (e.g., in step 714). In some aspects, the second input data may reflect a selective manipulation of a position of the selected obligation-based interface element within the presented GUI, and based on the selected manipulation of the interface-element position, device 102 may be configured to associate the manipulated position with a corresponding one of the temporal interface elements, which may represent a corresponding one of the available resolution dates selected by user 101 for resolution of the obligation associated with the selected obligation-based interface element (e.g., in step 716).

For example, and as described above in FIG. 5B, user 101 may select the obligation-based interface element associated with the Rogers™ Communications wireless bill by establishing contact between the finger and the portion of display-unit surface 110 at the first contact position, which is enclosed by the boundary of the obligation-specific interface element. In further instances, and while maintaining contact with display-unit surface 110, user 110 may slide the finger across display-unit surface 110 to a second contact position 532, at which time user 101 may release the maintained contact between the finger and display-unit surface 110. In one instance, and as described above, the translation of user 101's finger across display-unit surface 110 from first contact position 530 to second contact position 532 may correspond to a movement of the selected obligation-specific interface element from its initial position within the GUI to a subsequent position, which may cause the selected obligation-specific interface to coincide with at least a portion of the temporal interface element representative of the November $29^{th}$ resolution data. In some aspects, the selective manipulation of the obligation-specific interface element by user 101 within the presented GUI may indicate an intention of user 101 to schedule a resolution of the Rogers™ Communication bill on November $29^{th}$.

Referring back to FIG. 7, device 102 may be configured in step 716 to process the second input data to identify the second contact position of user 101's finger (e.g., as indicated within the second input data as a position associated with the loss of contact between the finger and the display-unit surface). Based on portions of the generated mapping data, and using any of the exemplary processes described above, device 102 may be configured to establish the boundaries of the temporal interface element representative of the available November $29^{th}$ resolution date (e.g., temporal interface element 522 of FIG. 5B), determine positions within the presented GUI that would correspond to the anticipated boundaries of the selected obligation-specific interface element (e.g., interface element 512 of FIG. 5) when centered at second contact position, and identify at least one intersection between these anticipated boundaries and the established boundaries of the temporal interface element representative of the available November $29^{th}$ resolution date.

Based on the identified intersection, device 102 may be configured to determine that the selected obligation-specific interface element, as moved by user 101, now overlaps at least a portion of the temporal interface element representative of the available November $29^{th}$ resolution date, and based on the determination, device 102 may establish that user 101 intends to schedule the resolution of the Rogers™ Communications wireless bill on November $29^{th}$ (e.g., in step 714).

Device 102 may, in some aspects, perform any of the exemplary processes described to schedule the resolution of the obligation associated with the selected obligation-specific interface element, e.g., the Rogers™ Communications wireless bill, on the available date represented by the overlapped temporal interface element, e.g., the available November $29^{th}$ resolution date (e.g., in step 718). Additionally, in step 716, device 102 may perform any of those operations described above, which include the generation and presentation of additional interface elements within the GUI, that enable 101 to view and select one or more available payment instruments or sources of funding for use in the scheduled resolution.

In additional aspects, device 102 may determine whether additional input requires processing for obligation scheduling or funding (e.g., in step 720). If device 102 were to identify additional, unprocessed input data (e.g., step 720; YES), exemplary process 700 may pass back to step 712, and device 102 may process first input data using any of the exemplary processes described above. Alternatively, if device 102 were to identify no additional, unprocessed input data (e.g., step 720; NO), exemplary process 700 may be complete in step 722.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including aggregation module 202, interface generation module 204, selection module 210, and scheduling module 410, can be implemented as one or more computer programs, i.e., one or more modules of computer program instructions encoded on a tangible non-transitory program carrier for execution by, or to control the operation of, data processing apparatus.

Additionally or alternatively, the program instructions can be encoded on an artificially-generated propagated signal, such as a machine-generated electrical, optical, or electro-magnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "apparatus" or "system" refers to data processing hardware and encompasses all kinds of apparatus, devices, and machines for processing data, including by way of example a programmable processor, a computer, or multiple processors or computers. The apparatus or system can also be or further include special purpose logic circuitry, such as an FPGA (field programmable gate array) or an ASIC (application-specific integrated circuit). The apparatus or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of nonvolatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computer system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computer system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A device, comprising:
a display unit;
an input unit;
a storage unit storing instructions; and
at least one processor coupled to the display unit, the input unit, and the storage unit, the at least processor being configured to execute the instructions to:
  display, on the display unit, an interface that includes a first interface element and a plurality of second interface elements, the first interface element being representative of an obligation and being disposed at a first position within the interface, and the second interface elements being representative of time periods available for resolving the obligation;
  receive first input data from the input unit indicative of a selection of the first interface element;
  receive second input data from the input unit indicative of a movement of the selected first interface element from the first position within the interface to a second position within the interface;
  establish an association between the second position of the selected first interface element and a corresponding one of the second interface elements;
  receive third input data from the input unit indicative of a movement of a third interface element from a third position within the interface to the second position, the third interface element being representative of an account associated with the device;
  based on the third input data, establish an association between the obligation and the account represented by the third interface element;
  perform operations that schedule the obligation for resolution during the time period represented by the corresponding second interface element, the scheduled resolution involving the account represented by the third interface element; and
  generate and display, on the display unit, an icon representative of the obligation, the icon having a visual characteristic indicative of a relationship between the time period and a deadline associated with the obligation.

2. The device of claim 1, wherein:
the display unit comprises a liquid-crystal display; and
the input unit comprises a capacitive overlay disposed onto a surface of the liquid crystal display.

3. The device of claim 1, wherein the at least processor is further configured to execute the instructions to display the first interface element at the second position within the interface.

4. The device of claim 1, wherein the at least processor is further configured to execute the instructions to:
obtain data indicative of an event associated with the device, the obtained data identifying a scheduled occurrence of the event;
generate a fourth interface element representative of the event;
determine that a time period represented by an additional one of the second interface elements includes the scheduled occurrence; and
display, on the display unit, the fourth interface element at a position within the interface that is proximate to the additional one of the second interface element.

5. The device of claim 1, wherein:
the time periods correspond to successive time periods available for resolving the obligations; and
the displayed second interface elements establish a continuous timeline within the interface indicative of the successive time periods available for resolving the obligations.

6. The device of claim 1, wherein the at least one processor is further configured to execute the instructions to:
obtain data establishing a boundary of the second interface element within the interface;
determine, based on the obtained data, that the second position is disposed within a first area of the interface enclosed by the established boundary; and
in response to the determination that the second position is disposed within the first area, establish the association between the second position of the selected first interface element and the corresponding second interface element.

7. The device of claim 6, wherein the at least one processor is further configured to execute the instructions to:
establish a boundary of the selected first interface element when disposed at the second position within the interface;
determine that a second area enclosed by the established boundary of the selected first interface element coincides with a portion of the first area; and
in response to the determination that the second area coincides with a portion of the first area, establish the association between the second position of the selected first interface element and the corresponding second interface element.

8. The device of claim 1, wherein:
the obligation corresponds to an invoice generated by a third party; and
the resolution corresponds to a transfer of funds from the account associated with the device to an account of the third-party.

9. The device of claim 1, wherein:
the generated icon comprises at least one of a predetermined icon associated with the obligation or an icon selected by a user of the device; and
the at least processor is further configured to execute the instructions to:
  display, on the display unit, the first interface element and the plurality of the second interface elements together within a single screen of the interface; and
  display, on the display unit, the generated icon at the second position within the single screen of the interface.

10. The device of claim 1, wherein:
the at least processor is further configured to execute the instructions to display the first interface element at the second position within the interface; and
the displayed icon replaces the first interface element at the second position within the interface.

11. The device of claim 1, wherein:
the interface further includes a plurality of additional third interface elements, each of the additional third interface elements being representative of an additional account associated with the device; and
the at least one processor is further configured to:
  based on the third input data, associate the third interface element and the selected first interface element; and
  display, on the display unit, the third interface element at the second position within the interface, the third interface element obscuring at least a portion of the selected first interface element within the interface.

12. The device of claim 1, wherein the at least one processor is further configured to:
- based on the established association between the obligation and the account, load, from the memory, obligation data that identifies the obligation and account data that identifies the account;
- generate scheduling information that characterizes the scheduled resolution of the obligation based on the obligation and account data; and
- transmit the scheduling information to a computing system, the computing system being configured to resolve the obligation in accordance with the scheduling information.

13. A computer-implemented method, comprising:
- displaying, by the at least one processor, and on a display unit coupled to the at least one processor, an interface that includes a first interface element and a plurality of second interface elements, the first interface element being representative of an obligation and being disposed at a first position within the interface, and the second interface elements being representative of time periods available for resolving the obligation;
- receiving, by the at least one processor, first input data from an input unit indicative of a selection of the first interface element;
- receiving, by the at least one processor, second input data from the input unit indicative of a movement of the selected first interface element from the first position within the interface to a second position within the interface;
- establishing, by the at least one processor, an association between the second position of the selected first interface element and a corresponding one of the second interface elements;
- receiving, by the at least one processor, third input data from the input unit indicative of a movement of a third interface element from a third position within the interface to the second position, the third interface element being representative of an account associated with the device;
- based on the third input data, establishing, by the at least one processor, an association between the obligation and the account represented by the third interface element
- performing, by the at least one processor, operations that schedule the obligation for resolution during the time period represented by the corresponding second interface element, the scheduled resolution involving the account represented by the third interface element; and
- by the at least one processor, generating and displaying, on the display unit, an icon representative of the obligation, the icon having a visual characteristic indicative of a relationship between the time period and a deadline associated with the obligation.

14. The computer-implemented method of claim 13, further comprising:
- obtaining data indicative of an event associated with the device, the obtained data identifying a scheduled occurrence of the event;
- generating a fourth interface element representative of the event;
- determining that a time period represented by an additional one of the second interface elements includes the scheduled occurrence; and
- displaying, on the display unit, the fourth interface element at a position within the interface that is proximate to the additional one of the second interface element.

15. The computer-implemented method of claim 13, wherein:
- the time periods correspond to successive time periods available for resolving the obligations; and
- the displayed second interface elements establish a continuous timeline within the interface indicative of the successive time periods available for resolving the obligations.

16. The computer-implemented method of claim 13, further comprising:
- obtaining data establishing a boundary of the second interface element within the interface;
- determining, based on the obtained data, that the second position is disposed within a first area of the interface enclosed by the established boundary; and
- in response to the determination that the second position is disposed within the first area, establishing the association between the second position of the selected first interface element and the corresponding second interface element.

17. The computer-implemented method of claim 16, further comprising:
- establishing a boundary of the selected first interface element when disposed at the second position within the interface;
- determining that a second area enclosed by the established boundary of the selected first interface element coincides with a portion of the first area; and
- in response to the determination that the second area coincides with a portion of the first area, establishing the association between the second position of the selected first interface element and the corresponding second interface element.

18. The computer-implemented method of claim 13, further comprising:
- displaying, on the display unit, the selected first interface element at the second position within the interface,
- wherein:
  - the obligation corresponds to an invoice generated by a third party; and
  - the resolution corresponds to a transfer of funds from the account associated with the device to an account of the third-party.

19. A tangible, non-transitory computer-readable medium storing instructions that, when executed by at least one processor, perform a method comprising:
- displaying, on a display unit coupled to the at least one processor, an interface that includes a first interface element and a plurality of second interface elements, the first interface element being representative of an obligation and being disposed at a first position within the interface, and the second interface elements being representative of time periods available for resolving the obligation;
- receiving first input data from an input unit indicative of a selection of the first interface element;
- receiving second input data from the input unit indicative of a movement of the selected first interface element from the first position within the interface to a second position within the interface;
- establishing an association between the second position of the selected first interface element and a corresponding one of the second interface elements;
- receiving third input data from the input unit indicative of a movement of a third interface element from a third position within the interface to the second position, the third interface element being representative of an account associated with the device;

based on the third input data, establishing an association between the obligation and the account represented by the third interface element;

performing operations that schedule the obligation for resolution during the time period represented by the corresponding second interface element, the scheduled resolution involving the account represented by the third interface element; and generating and displaying, on the display unit, an icon representative of the obligation, the icon having a visual characteristic indicative of a relationship between the time period and a deadline associated with the obligation.

20. The computer-implemented method of claim 13, wherein:

the generated icon comprises at least one of a predetermined icon associated with the obligation or an icon selected by a user of the device; and displaying the first interface element and the plurality of the second interface elements comprises displaying, on the display unit, the first interface element and the plurality of the second interface elements together within a single screen of the interface; and displaying the generated icon comprises displaying, on the display unit, the generated icon at the second position within the single screen of the interface.

* * * * *